US005481703A

United States Patent [19]
Kato

[11] Patent Number: 5,481,703
[45] Date of Patent: Jan. 2, 1996

[54] DATABASE RESTRUCTURING SYSTEM FOR DETECTING FUNCTIONALLY DEPENDENT RELATIONS AND CONVERTING THEM INTO THIRD NORMAL FORM

[75] Inventor: Nobuhiro Kato, Tokyo, Japan

[73] Assignee: Kabushiki Kaisha Toshiba, Kawasaki, Japan

[21] Appl. No.: 128,198

[22] Filed: Sep. 29, 1993

[30] Foreign Application Priority Data

Sep. 30, 1992 [JP] Japan ..................... 4-261334

[51] Int. Cl.⁶ ............. G06F 15/00; G06F 7/04
[52] U.S. Cl. ............. 395/600; 364/282.1; 364/283.4; 364/283.1
[58] Field of Search ............. 395/600; 364/DIG. 1, 364/DIG. 2

[56] References Cited

U.S. PATENT DOCUMENTS 5,247,665  9/1993  Matsuda et al. ............. 395/600
5,261,093 11/1993  Asmuth ............. 395/600
5,283,894  2/1994  Deran ............. 395/600
5,295,256  3/1994  Bapat ............. 395/500
5,295,261  3/1994  Simonetti ............. 395/600
5,367,675 11/1994  Cheng et al. ............. 395/600
5,369,761 11/1994  Conley et al. ............. 395/600

Primary Examiner—Thomas G. Black
Assistant Examiner—Jean R. Homere
Attorney, Agent, or Firm—Cushman, Darby & Cushman

[57] ABSTRACT

A database restructuring system normalizes a table of a relational database to generate a third normal form relation. The database restructuring system is present independently of a database management system. The database restructuring system accesses a database using a data manipulation language such as an SQL supplied from the database management system. When the database is to be restructured, a database manager requests the database restructuring system to normalize a designated relation. The database restructuring system provides a function of converting the designated relation into a third normal form relation in accordance with a functional dependency.

32 Claims, 19 Drawing Sheets

FIG. 1 (PRIOR ART)

RELATION 1 : PERSONNEL AND PAYROLL

| EMPLOYEE NUMBER | NAME | SECTION | LOCATION | SALARY ($) | MONTH |
|---|---|---|---|---|---|
| 1001 | (DAVID, DOUGLAS) | FIRST SALES SECTION | WASHINGTON, D.C. | 2500 | 1992.1 |
| 1001 | (DAVID, DOUGLAS) | FIRST SALES SECTION | WASHINGTON, D.C. | 2500 | 1992.2 |
| 1001 | (DAVID, DOUGLAS) | FIRST SALES SECTION | WASHINGTON, D.C. | 3000 | 1992.3 |
| 1002 | (MARY, SMITH) | SECOND DESIGN SECTION | NEW YORK | 2000 | 1992.3 |
| 1003 | (NANCY, WHITE) | ACCOUNTING SECTION | WASHINGTON, D.C. | 1500 | 1992.3 |
| 1004 | (TOM, JORDAN) | FIRST SALES SECTION | WASHINGTON, D.C. | 3000 | 1992.3 |
| 1005 | (NANCY, WHITE) | SECOND SALES SECTION | NEW YORK | 2000 | 1992.3 |

FIG. 2 (PRIOR ART)

RELATION 2 : PERSONNEL AND ALLOWANCE

| EMPLOYEE NUMBER | NAME | SECTION | LOCATION | SALARY ($) | MONTH |
|---|---|---|---|---|---|
| 1001 | DAVID DOUGLAS | FIRST SALES SECTION | WASHINGTON, D.C. | 2500 | 1992.1 |
| 1001 | DAVID DOUGLAS | FIRST SALES SECTION | WASHINGTON, D.C. | 2500 | 1992.2 |
| 1001 | DAVID DOUGLAS | FIRST SALES SECTION | WASHINGTON, D.C. | 3000 | 1992.3 |
| 1002 | MARY SMITH | SECOND DESIGN SECTION | NEW YORK | 2000 | 1992.3 |
| 1003 | NANCY WHITE | ACCOUNTING SECTION | WASHINGTON, D.C. | 1500 | 1992.3 |
| 1004 | TOM JORDAN | FIRST SALES SECTION | WASHINGTON, D.C. | 3000 | 1992.3 |
| 1005 | NANCY WHITE | SECOND SALES SECTION | NEW YORK | 2000 | 1992.3 |

PERSONNEL

| EMPLOYEE NUMBER | NAME | SECTION | LOCATION |
|---|---|---|---|
| 1001 | DAVID DOUGLAS | FIRST SALES SECTION | WASHINGTON, D.C. |
| 1002 | MARY SMITH | SECOND DESIGN SECTION | NEW YORK |
| 1003 | NANCY WHITE | ACCOUNTING SECTION | WASHINGTON, D.C. |
| 1004 | TOM JORDAN | FIRST SALES SECTION | WASHINGTON, D.C. |
| 1005 | NANCY WHITE | SECOND SALES SECTION | NEW YORK |

FIG. 3A (PRIOR ART)

ALLOWANCE

| EMPLOYEE NUMBER | SALARY ($) | MONTH |
|---|---|---|
| 1001 | 2500 | 1992.1 |
| 1001 | 2500 | 1992.2 |
| 1001 | 3000 | 1992.3 |
| 1002 | 2000 | 1992.3 |
| 1003 | 1500 | 1992.3 |
| 1004 | 3000 | 1992.3 |
| 1005 | 2000 | 1992.3 |

FIG. 3B (PRIOR ART)

EMPLOYEE

| EMPLOYEE NUMBER | NAME | SECTION |
|---|---|---|
| 1001 | DAVID DOUGLAS | FIRST SALES SECTION |
| 1002 | MARY SMITH | SECOND DESIGN SECTION |
| 1003 | NANCY WHITE | ACCOUNTING SECTION |
| 1004 | TOM JORDAN | FIRST SALES SECTION |
| 1005 | NANCY WHITE | SECOND SALES SECTION |

FIG. 4A (PRIOR ART)

ORGANIZATION

| SECTION | LOCATION |
|---|---|
| FIRST SALES SECTION | WASHINGTON, D.C. |
| SECOND DESIGN SECTION | NEW YORK |
| ACCOUNTING SECTION | WASHINGTON, D.C. |
| SECOND SALES SECTION | NEW YORK |

FIG. 4B (PRIOR ART)

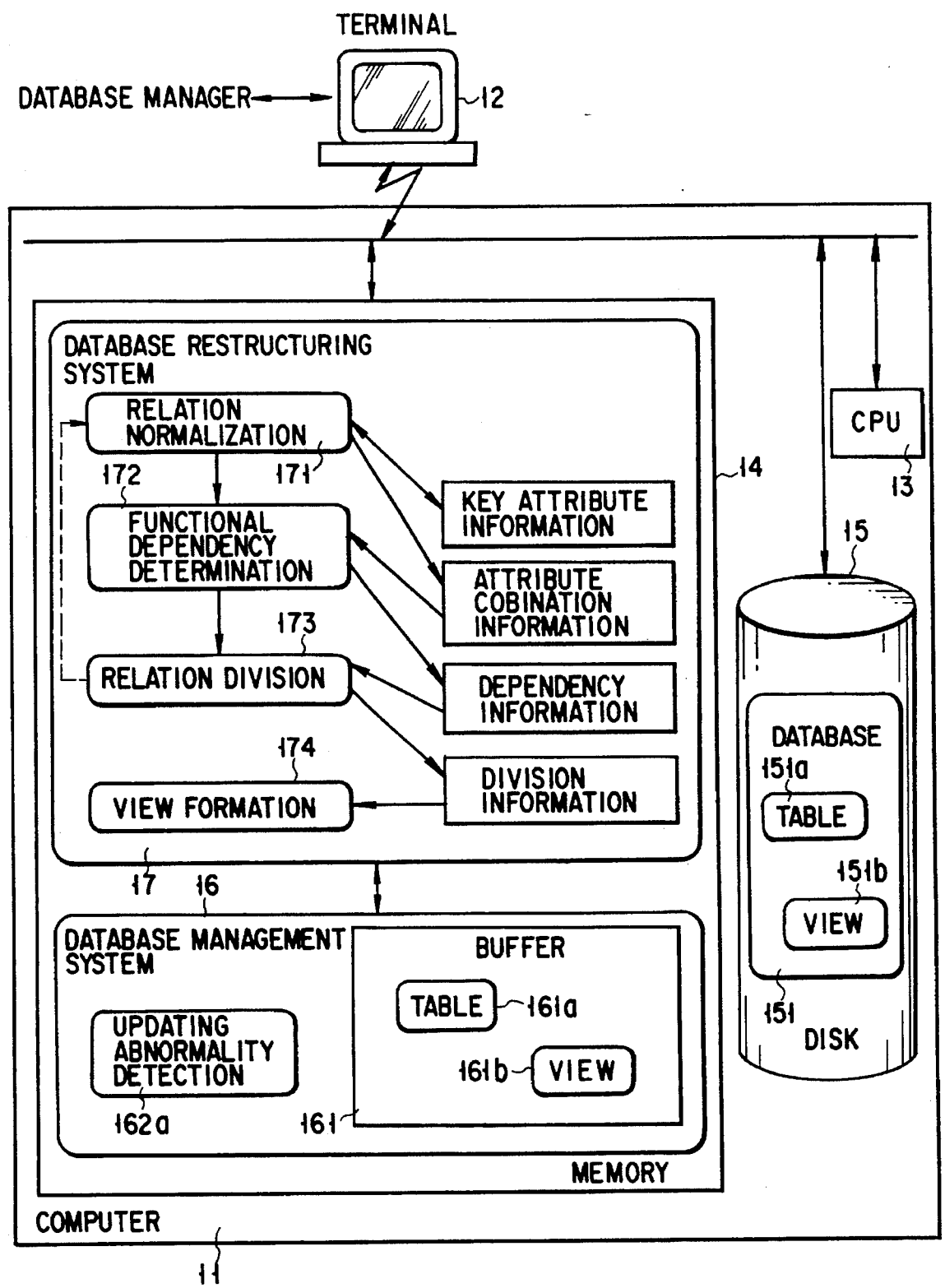
F I G. 5

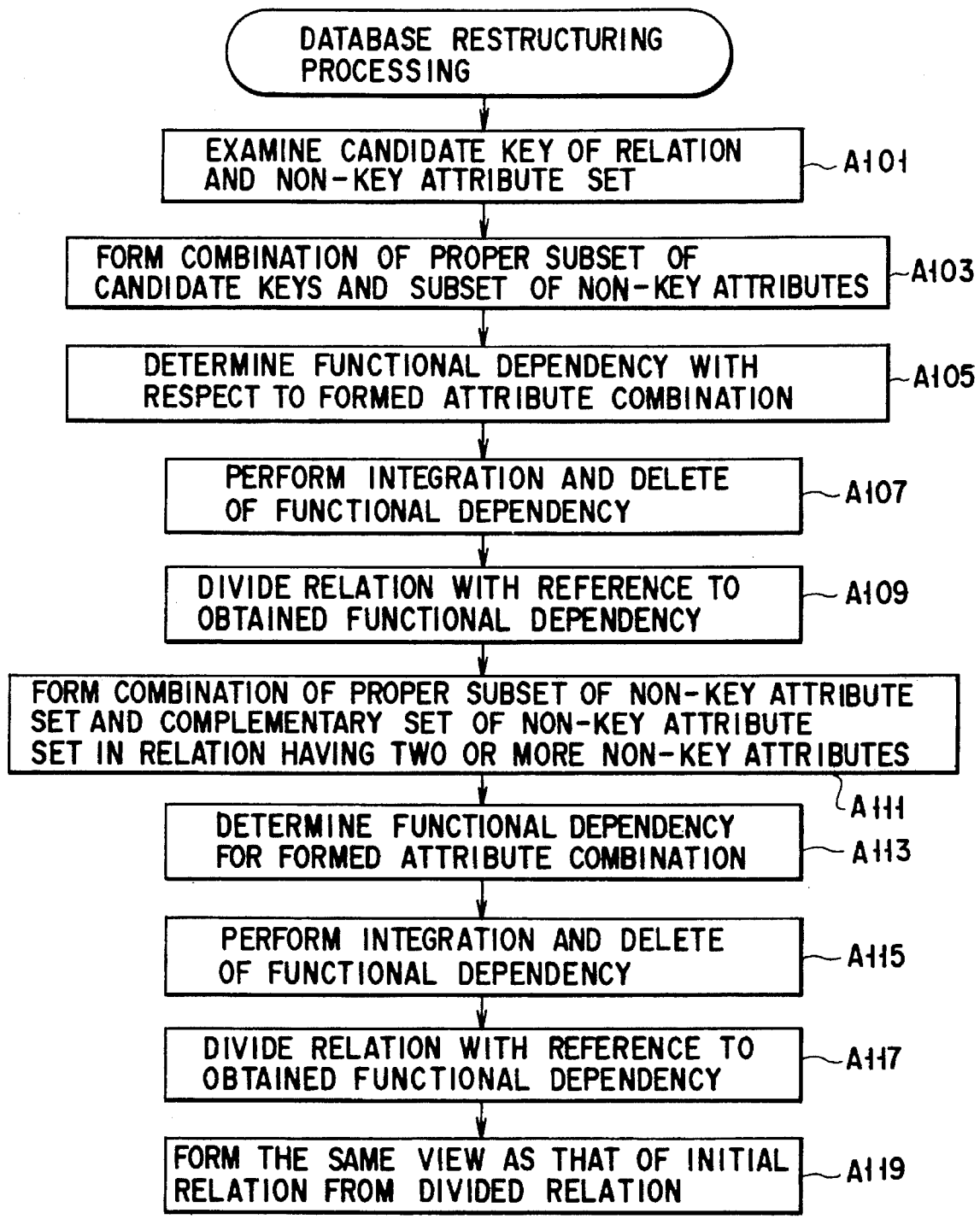
F I G. 6

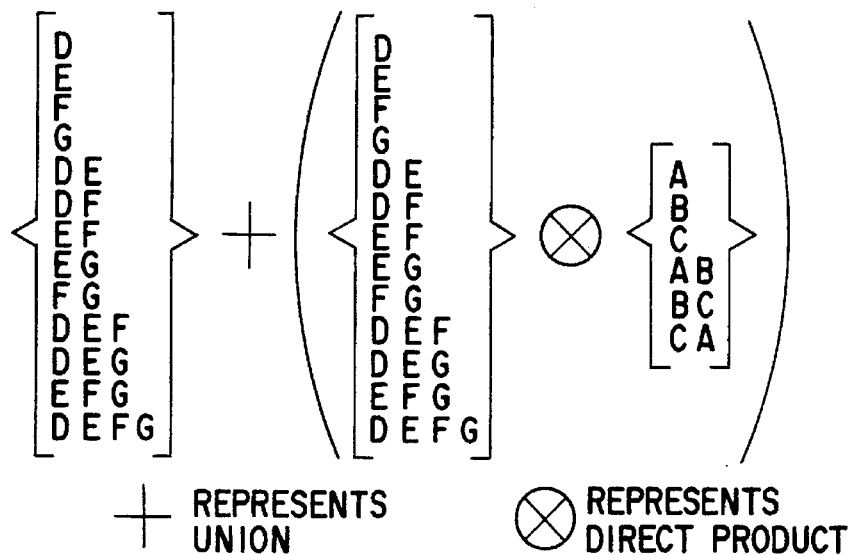
+ REPRESENTS UNION
⊗ REPRESENTS DIRECT PRODUCT
F I G. 7
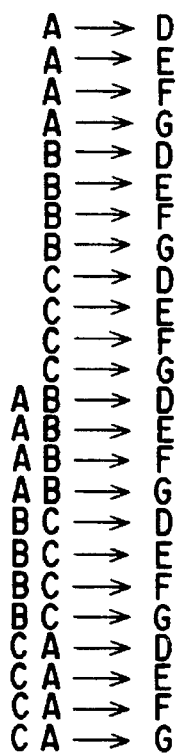
F I G. 9

| RELATION | CANDIDATE KEY | NON-KEY ATTRIBUTE SET |
|---|---|---|
| PERSONNEL | EMPLOYEE NUMBER | NAME, SECTION, LOCATION |
| ALLOWANCE | EMPLOYEE NUMBER, MONTH | SALARY |

| NAME | COUNT (DISTINCT SECTION |
|---|---|
| NANCY WHITE | 2 |

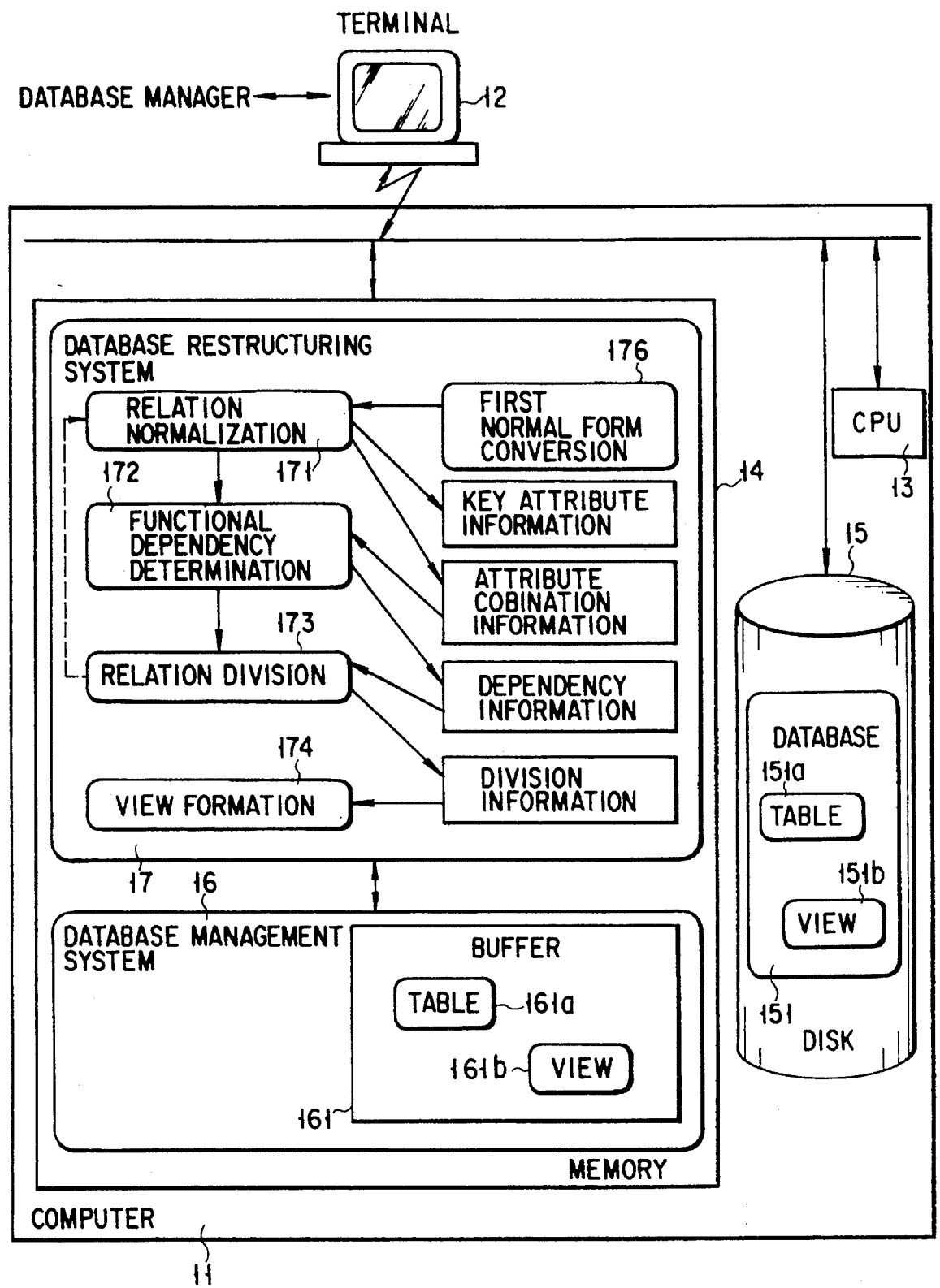
F I G. 15

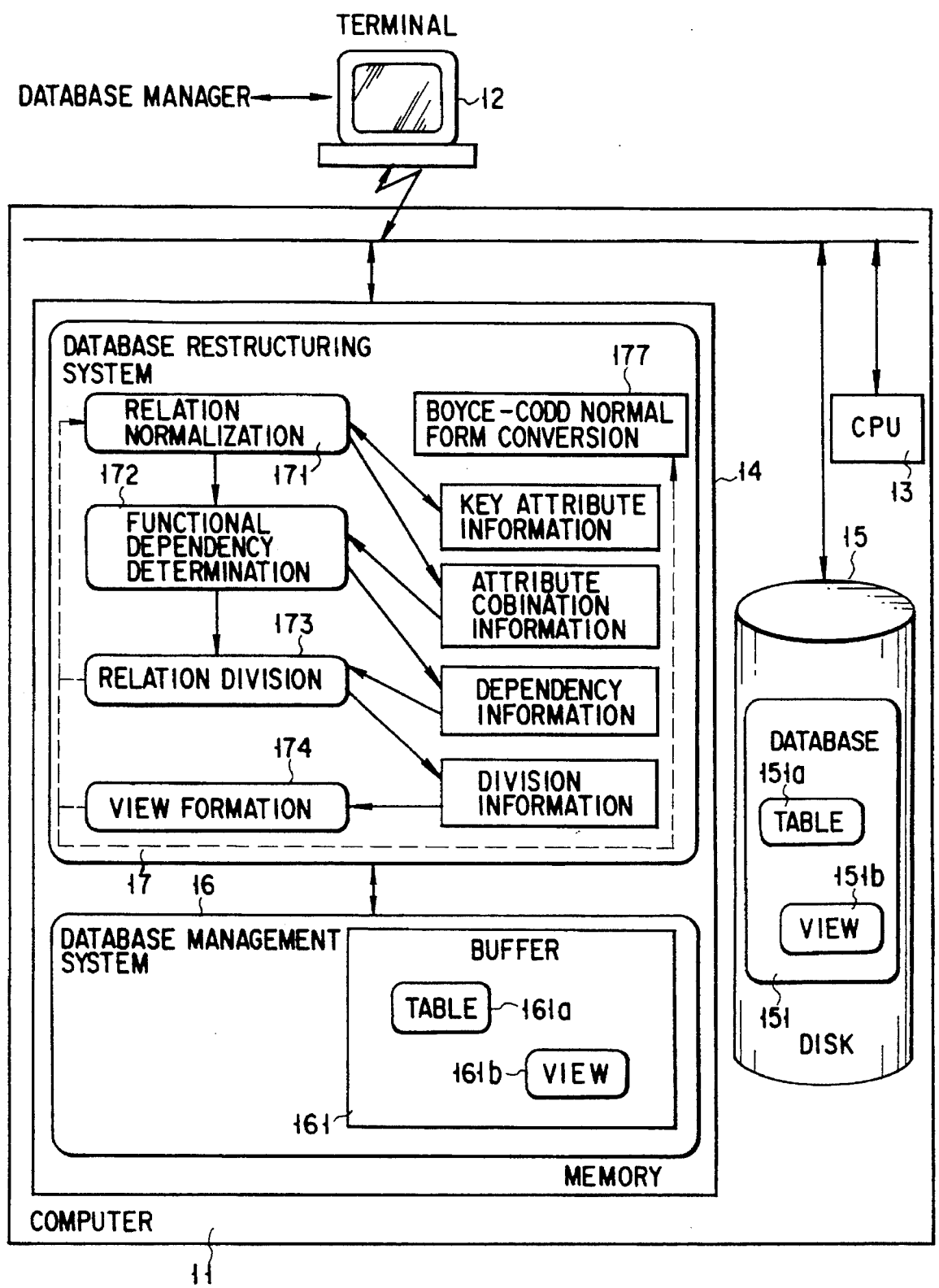
F I G. 18

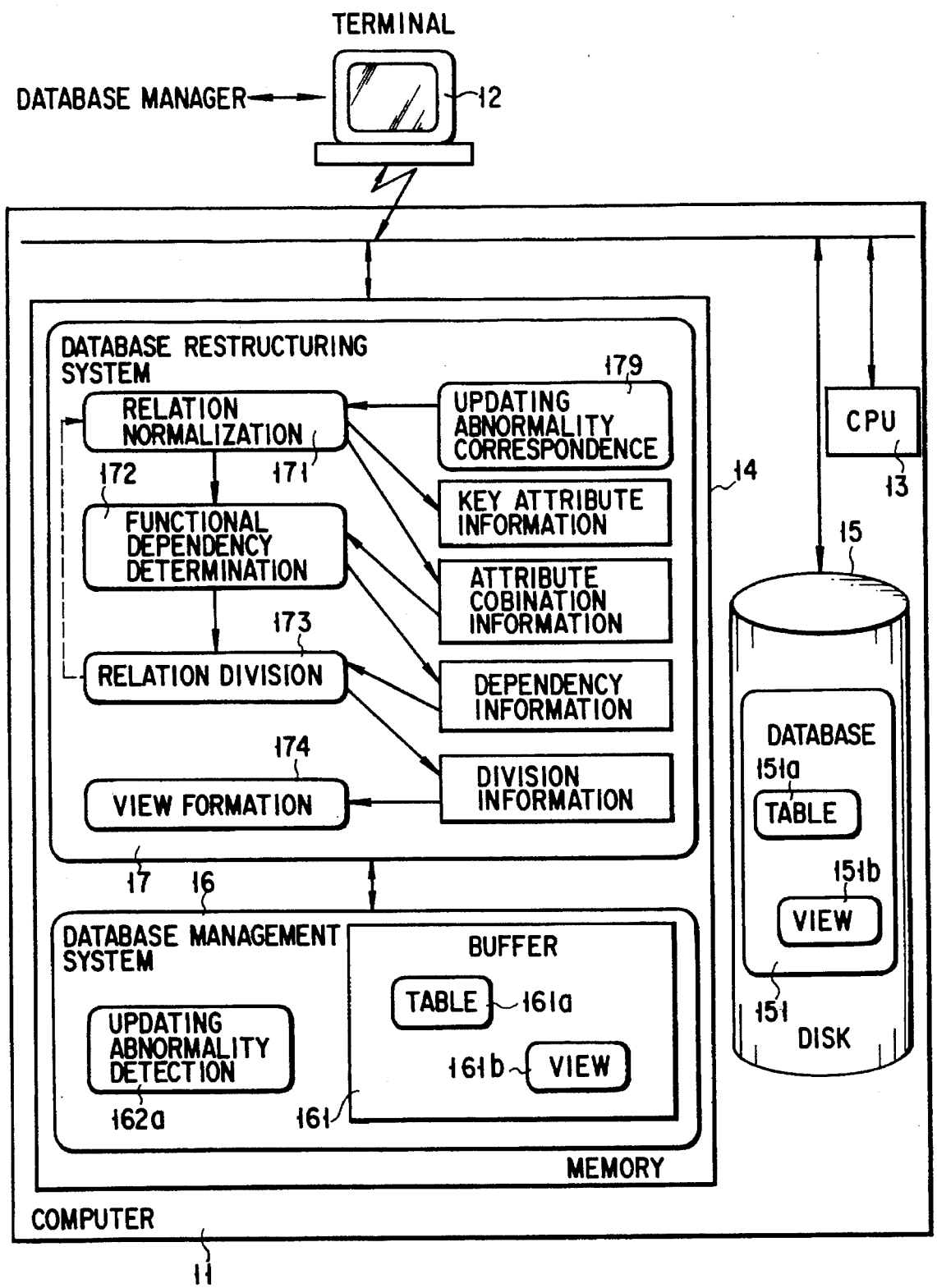
F I G. 20

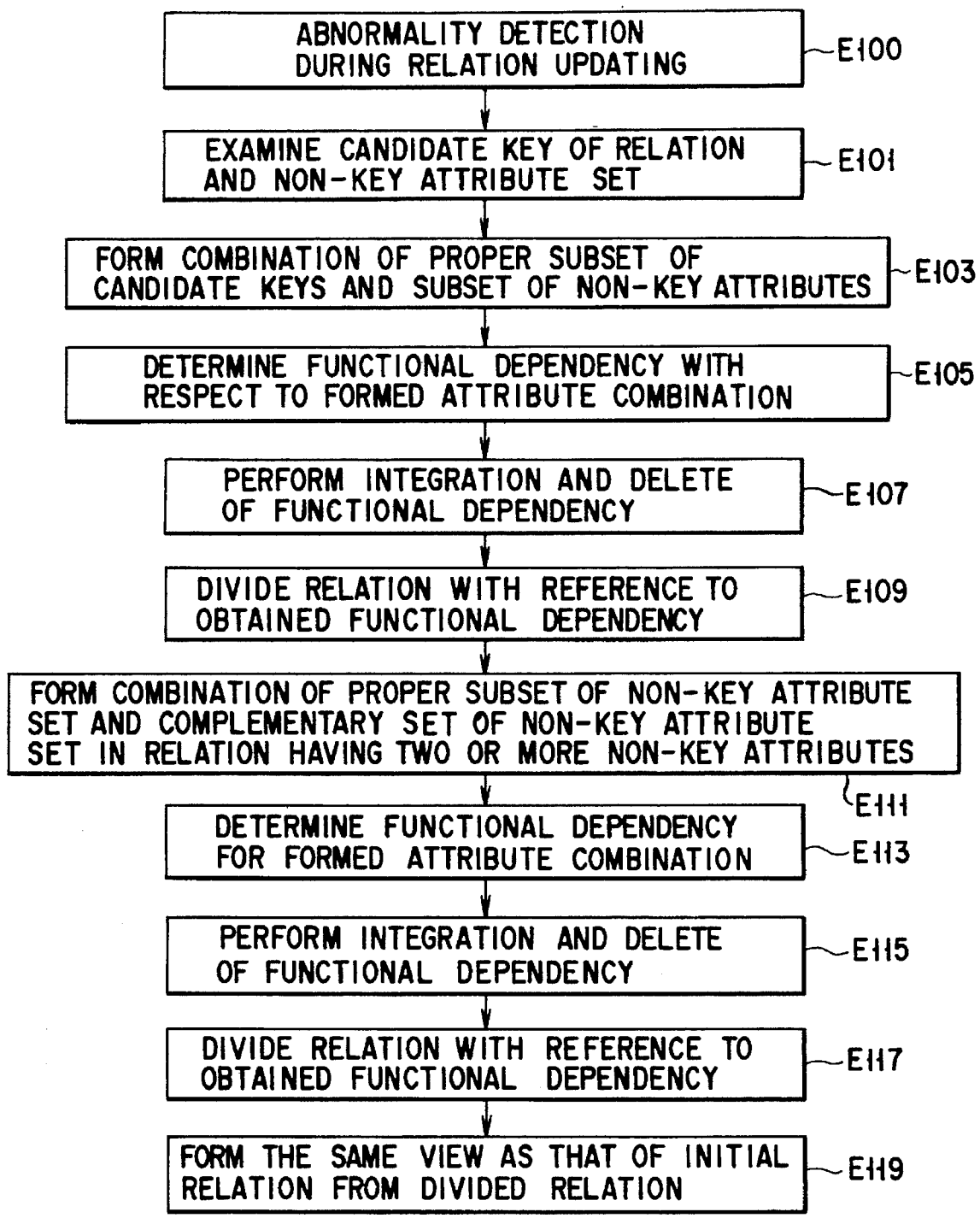
F I G. 21

DATABASE RESTRUCTURING SYSTEM FOR DETECTING FUNCTIONALLY DEPENDENT RELATIONS AND CONVERTING THEM INTO THIRD NORMAL FORM

BACKGROUND OF THE INVENTION

1. Field of the Invention

The present invention relates to a system and a method for restructuring a relational database.

2. Description of the Related Art

As a fundamental theory related to the structure of a relational database, a normalization theory is well known. This normalization theory is described in, e.g., Introduction to Relational Database, Data Model.SQL.Management System, Yoshifumi Masunaga, Science Sha.

As described in this book, when a relational database is to be designed, a third normal form relation must be defined. If a relation having no third normal form is defined, and this relation is used, a memory area required for storing the relation or the number of tuples in a table required to be updated is disadvantageously increased.

In order to explain the reason for posing the above problems, the normalization theory will be briefly described below first.

In a relational database, normal forms of relations defined with reference to a functional dependency include a first normal form, a second normal form, and a third normal form. A relation having the first normal form means that a value of any attribute of the relation cannot be divided any more. Therefore, a relation in which a set appears in the values of attributes or data having a structure appears has no first normal form. This means, in the above book, that a relation having the first normal form in a relational database defines that the "direct product, power set, and power set of direct product in the range of attributes are inhibited from being used as attribute values".

A relation having a second normal form means that all nonprime attributes of a relation having a first normal form are completely functionally dependent on any candidate key of the relation having the first normal form. In addition, a relation having a third normal form means that any attribute in the relation having the first normal form is not narrowly transitively dependent on any candidate key of the relation having the first normal form.

For example, since the value of an attribute <name> is selected from direct products of a range called a family name and a range called a first name (for descriptive convenience, a middle name is omitted) in a relation: 1 <personnel and payroll> shown in FIG. 1, the relation: 1 <personnel and payroll> has no first normal form. When this relation is normalized to have the first normal form, a relation: 2 <personnel and allowance> shown in FIG. 2 is obtained.

In the relation <personnel and allowance>, each attribute <employee number, month> is a main key. In this case, one main key is selected from at least one candidate key which is present in the relation. The candidate key is a minimum attribute set capable of uniquely identifying a tuple. The value of the main key is restricted not to be null.

In the first normal form relation <personnel and allowance> shown in FIG. 2, the following problems are posed. Eddie Adams is employed as a new employee, his employee number is set to be 1006, and his assigned section is set to be a second sales section. When this information is stored in the relation as a tuple, an attribute <month> is set to be null because his salary has not yet be paid. This is inconsistent with the above restriction, i.e., the value of the main key is not set to be null, and the tuple cannot be inserted. In addition, assuming that David Douglas is transferred to a second sales section, three tuples related to David Douglas must be simultaneously changed. This means a plurality of tuples must be changed in spite of a change in one data. Assuming that Mary Smith received no salary in March because she was employed in April, her tuple must be deleted. However, when the tuple is deleted, information in which Mary Smith belongs to the second design section and works in New York is deleted. The above problem is called relation update anomaly.

Since the updating abnormality occurs in the first normal form relation: 2 <personnel and allowance>, the first normal form relation is divided into two second normal form relations <personnel> and <allowance> shown in FIGS. 3A and 3B. In this case, the second normal form relation is a first normal relation as described above, and is a relation having non-key attributes which are completely dependent on an arbitrary candidate key. Attributes A which are completely dependent on attributes B mean that the values of the attributes A functionally determine the values of the attributes B (the values of the attributes B are functionally dependent on the values of the attributes A), and the value of an attribute A' which is an arbitrary proper subset of the attributes A does not functionally determine the values of the attributes B (the values of the attributes B are not functionally dependent on the value of the attribute A'). Note that the above dependency between attributes is called a functional dependency.

For example, in the relation: 2 <personnel and allowance>, since non-key attributes <name, section, location> are functionally dependent on not only candidate keys (main keys) <employee number, month> but also the attribute <employee number> which is a proper subset of the candidate keys, the non-key attributes are not completely dependent on the candidate keys. Therefore, the relation: 2 <personnel and allowance> does not have a second normal form.

On the other hand, the non-key attributes <name, section, location> are completely dependent on the candidate key <employee number> in the relation <personnel>, and the non-key attribute <salary> is completely dependent on the candidate keys <employee number, month> in the relation <allowance>. For this reason, both the relations <personnel> and <allowance> have second normal forms, respectively.

However, even in the second normal form relation <personnel>, the following update anomaly (updating abnormality) occurs. For example, assume that a third sales section is established in L.A. When this information is to be inserted in the relation as a tuple, the value of the <employee number> serving as a main key becomes null. This is inconsistent with the restriction in which the main key is not null. In addition, if Nancy white belonging to the accounting section is retired in the relation <personnel>, when his tuple is deleted, information in which the accounting section is located in Washington, D.C. is lost. In addition, if the location of the first sales section is changed to San Francisco, all tuples corresponding to persons belonging to the first sales section must be updated.

Since the above updating abnormality occurs in the second normal form relation <personnel>, the second normal relation is divided into two third normal form relations <employee> and <organization> shown in FIGS. 4A and 4B. The third normal form relation, as described above, is the second normal form relation, and is a relation in which an arbitrary non-key attribute is not functionally dependent on non-key attributes except for the arbitrary non-key attribute.

For example, since a non-key attribute <location> is functionally dependent on another non-key attribute <section> in the relation <personnel>, the relation <personnel> does not have a third normal form. On the other hand, since non-key attributes are not functionally dependent on other non-key attributes in both the relations <employee> and <organization> shown in FIGS. 4A and 4B, both the relations have three normal forms, respectively. In addition, the relation <allowance> shown in FIG. 3B has a third normal form. Therefore, a database constituted by the relations <employee>, <organization>, and <allowance>, any updating abnormality of the relations does not occur.

The normalization theory in a relational database has been described above. When there is a relation having no third normal form, the above updating abnormality occurs. Therefore, in designing a conventional relational database, dependencies are desirably defined such that all relations have third normal forms.

However, in fact, when the relations are to be defined, an operation of correctly detecting the functional dependencies and complete dependencies between attributes is very difficult. When a large number of relations have a large number of attributes, this operation becomes more difficult. Therefore, while the relational database is designed, i.e., while the attributes of relations are defined, the defined relations include a relation having no third normal form at a high probability. Even when several relations each having no third normal form are defined, and the database is operated, a database manager may notice that the relation having no third normal form is present. This case will be described below using an example.

Assume that a database manager defines the relation: 2 <personnel and allowance> shown in FIG. 2, and an application programmer prepares the following programs to the relation: 2 <personnel and allowance>.

Program 1

When a person is newly employed, a new employee number is added to the employee, a tuple including attributes <employee number, name, month> having values is inserted in the relation <personnel and allowance>. In this case, the value of the attribute <month> is set to be 9999.99 as a dummy value.

Program 2

When a salary is paid to an employee, the tuple corresponding to the employee is retrieved. If the employee is a new employee, the values of the attributes <salary, month> of the retrieved tuple are updated. Otherwise, a new tuple is formed and inserted in the relation.

Program 3

When the section of an employee is to be changed, the values of the attributes <section, location> of a tuple corresponding to the employee are updated.

Program 4

When an employee is retired, a tuple corresponding to this employee is deleted.

At this time, the following insertion, updating, and deleting operations of tuples can be performed.

1) When Eddie Adams is newly employed, a tuple (1006, Eddie Adams, NULL, NULL, NULL, 9999.99) is inserted using Program 1.

2) When a salary of $2,000 is paid to Eddie Adams in April 1992, the tuple is updated to (1006, Eddie Adams, NULL, NULL, 2,000, 1992.4) using Program 2.

3) When Eddie Adams is assigned to the second sales section, the tuple is updated to (1006, Eddie Adams, second sales section, New York, 2,000, 1992.4).

4) When a salary of $3,500 is paid to David Douglas, who has been employed, in April 1992, a tuple (1001, David Douglas, first sales section, Washington D.C., 3,500, 1992.4) is inserted using Program 2.

5) When David Douglas is transferred to the second sales section, all tuples each having an employee number 1001 are updated using Program 3.

6) When Mary Smith is retired, all tuples each having an employee number 1002 are deleted.

In this manner, since the inserting, updating, and deleting operations for the relation <personnel and allowance> can be performed, a database manager does not notice that a relation of the operated database has no third normal form.

When a relation having no third normal form is defined while a relational database is designed, and the relation is directly used, the following problems are posed.

1) The area for storing the relation is increased.

2) The number of tuples to be updated in an updating operation is increased.

The first problem will be described. In this case, memory areas corresponding to the relations shown in FIGS. 2 to 4B are considered.

Assume that information of 10,000 employees for 5 years (5×12 months) are stored in the first normal form relation <personnel and allowance> shown in FIG. 2. At this time, the number of tuples is $$10,000 \times 5 \times 12 = 600,000 \text{ (Tuples)}$$

Assuming that the size of each attribute is 10 bytes, the relation requires a memory area of $$600,000 \times 10 \times 6 = 36 \text{ (Mbytes)}$$

When the same information as that stored in the relation <personnel and allowance> is to be stored in the two relations <personnel> and <allowance> shown in FIGS. 3A and 3B, the relation <personnel> must have 10,000 tuples, and the relation <allowance> must have 600,000 tuples. For this reason, the relation <personnel> requires a memory area of $$10,000 \times 10 \times 4 = 400 \text{ (Kbytes)}$$

and the relation <allowance> requires a memory area of $$600,000 \times 10 \times 3 = 18 \text{ (Mbytes)}$$

A case wherein the same information as that stored in the relation <personnel> is stored in the relations <employee> and <organization> shown in FIGS. 4A and 4B will be considered. Assuming that 20 employees are assigned to each of 500 sections in the relation <personnel>, 10,000 tuples and 500 tuples are stored in the relations <employee> and <organization>, respectively. Therefore, the relations <employee> and <organization> respectively require memory areas of $$10,000 \times 10 \times 3 = 300 \text{ (Kbytes)}$$

500×10×2=10 (Kbytes)

For this reason, information which requires a 36-Mbyte memory area in the first normal form relation can be stored in a memory area of 18.4 Mbytes by normalizing the first normal form relation to a second normal form relation. In addition, when the relation is normalized to have a third normal form, the information can be stored in a memory area of 18.31 Mbytes. In this manner, a relation which is not normalized to have the third normal wastes memory area.

The second problem will be described below. Assuming that the relation <personnel and allowance> stores allowance information for 5 years, for example, there are 60 tuples for David Douglas having an employee number 1001. In this state, David Douglas is transferred from the first sales section to the second sales section, all the 60 tuples must be updated. On the other hand, in the relation <personnel> shown in FIG. 3A, there is only one tuple for David Douglas having the employee number 1001. For this reason, when the above transference is performed, only this tuple is updated.

Assume that the relation <personnel> stores 20 tuples of persons assigned to the first sales section. At this time, when the location of the first sales section is changed from Washington D.C. to New York, all the 20 tuples must be updated. On the other hand, in the relation <organization> shown in FIG. 4B, there is only one tuple for the first sales section. For this reason, when the above change is performed, only this tuple is updated.

As described above, in a relation which is not normalized, the number of tuples to be updated in an updating operation is increased. In general, as the number of tuples to be accessed is increased, the number of input/output operations of a disk is increased. For this reason, in the relation which is not normalized, the processing performance of a database is degraded by the increase in input/output operations.

As has been described above, in the conventional technique, when a relation having no third normal form is defined while a database is designed, the relation is directly used in database operation processing. For this reason, a memory area required for storing relations is increased, and, furthermore, the number of tuples to be updated in an updating operation is disadvantageously increased.

SUMMARY OF THE INVENTION

It is an object of the present invention to provide a database system and method therefor, for normalizing a relation defined by a database manager in accordance with a functional dependency and, even when the database manager defines a relation having no third normal form, automatically converting the relation into a third normal form relation.

In order to achieve the object, according to the present invention, there is provided, in a database system constituted by a host computer and at least one terminal connected to the host computer, the host computer having a CPU (Central Processing Unit), a memory for storing a relational database, and database management means for providing various operations related to database processing and a process related to input/output of the memory, a database restructuring system comprising: extraction means for extracting an attribute set of candidate keys and non-key attributes except for the candidate keys from a relation to be restructured of the relational database; first formation means for forming a combination between a proper subset of the candidate keys extracted by the extraction means and a subset of the non-key attributes; second formation means for forming a combination between a proper subset of a non-key attribute set and a complementary set of the non-key attribute set for a relation having not less than two non-key attributes; determination means for checking, with reference to values of tuples which are present in the relation, whether the non-key attributes are relatively dependent on the candidate keys in each of the combinations formed by the first and second formation means, and storing a determination result as dependency information; and division means for dividing the relation into a projection to an attribute set having a functional dependency and a projection to an attribute set of attributes except for non-key attributes having a functional dependency in accordance with the dependency information, wherein the second formation means forms a combination with reference to attribute information stored by the determination means and indicating a determination result for the combination formed by the first formation means.

According to the second aspect of the present invention, there is provided a relational database restructuring system, in which each tuple is managed as a two-dimensional relation for each attribute and each relation has a candidate key serving as a set of attributes which can uniquely identify the tuple, comprising: first determination means for checking, with reference to values of tuples which are present in the relations, whether an attribute set is functionally dependent on another attribute set; division means for dividing one relation into two relations by projecting operation for a designated attribute set; second determination means for determining, in attribute sets A and B which are included in a relation and are mutually primary, that the attribute set A is a proper subset of the candidate key and the attribute set B is a subset of a non-key attribute set serving as a subset of the candidate key, or that both the attribute sets A and B are proper subsets of the non-key attribute set; and means for checking whether the attribute set B is functionally dependent on the attribute A and dividing a relation into a projection formed by a subset of the attribute set B and, if the attribute sets A and B have a functional relation, dividing a relation into a projection formed by a union between the attribute sets A and B in the attribute sets A and B which are determined by the second determination means to satisfy a nature.

According to the third aspect of the present invention, there is provided, in a database system constituted by a host computer and at least one terminal connected to the host computer, the host computer having a CPU (Central Processing Unit), a memory for storing a relational database, and database management means for providing various operations related to database processing and a process related to input/output of the memory, a method of restructuring a database comprising the steps of: a) extracting an attribute set of candidate keys and non-key attributes except for the candidate keys from a relation to be restructured; b) forming a combination between a proper subset of the candidate keys extracted in the step a) and a subset of the non-key attributes; c) forming a combination between a proper subset of a non-key attribute set and a complementary set of the non-key attribute set for a relation having not less than two non-key attributes; d) checking, with reference to values of tuples which are present in the relation, whether the non-key attributes are relatively dependent on the candidate keys in each of the combinations formed in the steps b) and c), and storing a determination result as dependency information, and storing attribute information representing the determination result; and e) dividing the relation into a projection to an attribute set having a functional dependency and a projection to an attribute set of attributes except for non-key attributes having a functional dependency in accordance with the dependency information, wherein, in the step c), the combination is formed with reference to the attribute information stored in the step d) and representing a determination result for the combination formed in the step c).

According to the fourth aspect of the present invention, there is provided a method of restructuring a relational database, in which each tuple is managed as a two-dimensional relation for each attribute and each relation has a candidate key serving as a set of attributes which can uniquely identify the tuple, comprising the steps of: a) checking, with reference to values of tuples which are present in the relations, whether an arbitrary attribute set is functionally dependent on another attribute set; b) dividing one relation into two relations by a projecting operation for a designated attribute set; c) performing the steps a) and b) for attribute sets A and B which are included in a relation and are mutually primary, when the attribute set A is a proper subset of the candidate key and the attribute set B is a subset of a non-key attribute set serving as a subset of the candidate key; and d) performing the steps a) and b) when the attribute sets A and B are proper subsets of the non-key attribute set in the attribute sets A and B which are mutually primary and included in a relation.

In a relation in the system arranged as described above, a proposition that the attribute set B is functionally dependent on the attribute set A is defined as a proposition X, and the following proposition is defined as a proposition Y: if there are a plurality of tuples each having the attribute set A having equal values, then the values of the attribute sets B of the respective tuples are equal to each other. The proposition X is a sufficient condition for the proposition Y, but the proposition X is not necessary condition for the proposition Y. That is, if the proposition X is true, the proposition Y is true. However, even if the proposition Y is true, the proposition X is not always true.

However, when there are a larger number of tuples, if the proposition Y is true, the proposition X is probably true because of the following reason. In this case, when the values of the attribute sets A are determined for the large number of tuples, the nature of a functional dependency, i.e., the values of the attribute set B of the corresponding tuple can be uniquely determined, can be confirmed. Therefore, the values of the attribute sets to be determined can be used as a means for determining a functional dependency between attribute sets of a relation having tuples. When the functional dependency can be determined, a complete dependency can also be determined. In this manner, when a dependency between attributes is determined from a relation having at least a first normal form, and proper division of the relation is performed, a third normal form relation can be formed.

As described above, a memory area for storing a relation without damaging information and the number of tuples to be updated in an updating operation can be decreased.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a table showing a conventional non-normal form relation (prior art);

FIG. 2 is a table showing a conventional first normal form relation (prior art);

FIGS. 3A and 3B are tables showing a conventional second normal form relation and a conventional third normal form relation, respectively, (prior art);

FIGS. 4A and 4B are tables showing a conventional third normal form relation (prior art);

FIG. 5 is a block diagram showing the arrangement of a database system according to an embodiment of the present invention;

FIG. 6 is a flow chart for explaining a normalization processing operation performed by a database restructuring system arranged in the embodiment;

FIG. 7 is a view showing combinations of attributes for detecting a candidate key in the embodiment;

FIG. 9 is a view showing attribute combination information in the embodiment;

FIG. 15 is a block diagram showing the arrangement of a database system according to the third embodiment of the present invention;

FIG. 18 is a block diagram showing the arrangement of a database system according to the fifth embodiment of the present invention;

FIG. 20 is a block diagram showing the arrangement of a database system according to the sixth embodiment of the present invention;

FIG. 21 is a flow chart for explaining database restructuring processing in the above arrangement of the sixth embodiment of the present invention;

DETAILED DESCRIPTION OF THE PREFERRED EMBODIMENTS

Figure 8:
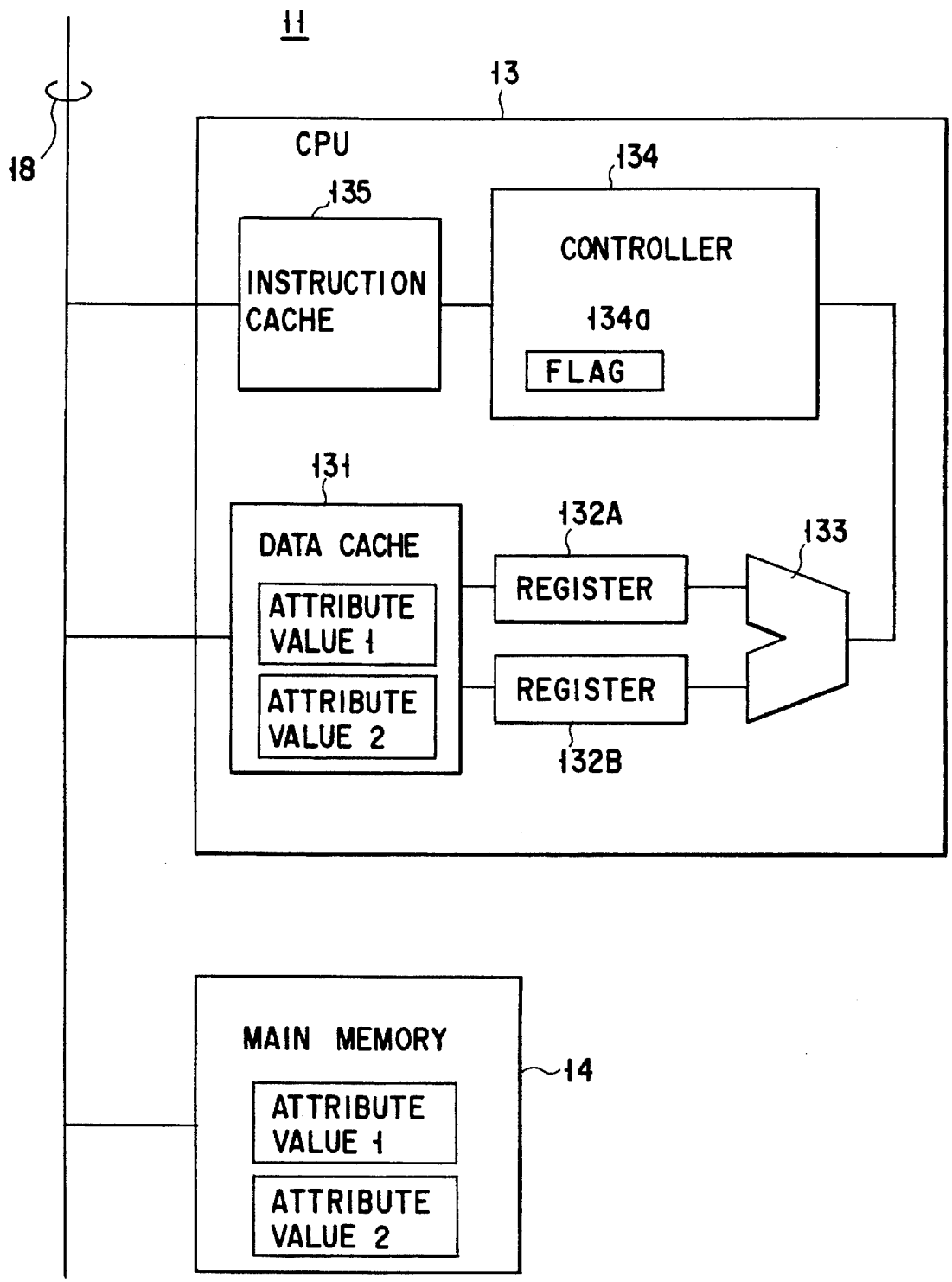
FIG. 8 is a view showing the arrangement of hardware applied to detect a candidate key in the database system shown in FIG. 5.

An embodiment of the present invention will be described below with reference to the accompanying drawings.

FIG. 5 shows the arrangement of a database system according to the first embodiment of the present invention. This database system is realized by a computer system including a host computer 11 and a terminal 12 connected to the host computer 11.

The host computer 11 comprises a CPU (Central Processing Unit) 13, a main memory 14, and a magnetic disk device 15. The CPU 13 is used for operating the whole host computer 11 and performs various operations related to database processing and the input/output control of the magnetic disk device 15 by executing programs stored in the main memory 14.

A database management system 16 and a database restructuring system 17 are stored in the main memory 14 as processes to be executed. A relational database 151 is stored in the magnetic disk device 15, and a table 151a and a view 151b defined by a view function (to be described later) are stored in the relational database 151.

The database management system 16 provides, to a database manager, retrieval of the relational database 151 of the magnetic disk device 15 and various relational database operations such as an updating operation using a data manipulation language such as an SQL (Structured Query Language).

The database management system 16 supports a view function. This view function is a function of displaying the visible images of tables viewed from various view points on a screen for a database manager who operates the terminal 12. A table 161a of the relational database 151 read in a buffer 161 is converted into a view 161b having a logical structure different from that of the table 161a and displayed on the screen of the terminal 12. The database manager can retrieve the database while referring to the view displayed on the screen. The database manager defines a table for designing a relational database using the database management system 16.

The database restructuring system 17 produces a third normal form relation by normalizing the table of the relational database 151, and is arranged independently of the database management system 16. The database restructuring system 17 accesses the relational database 151 using a data manipulation language such as an SQL provided by the database management system 16. In restructuring a database, the database manager requests the database restructuring system 17 to normalize a designated relation. At this time, the database manager need not recognize that the relation has no third normal form. Note that a large number of tuples must be present in the designated relation in advance.

The database restructuring system 17 receives the request from the database manager, and then finds a candidate key of the designated relation. In order to convert the relation from a first normal form relation to a second normal form relation or a third normal form relation, a functional dependency between attributes is determined, and the relation is divided. If the relation is the second normal form relation or the third normal form relation, this is found when the functional dependency between the attributes is determined. In order to convert the second normal form relation into the third normal form relation, a functional dependency between attributes is determined, and the relation is divided. If the relation is the third normal form relation, this is found when the functional dependency between the attributes is determined. Finally, the database restructuring system 17 forms the same view as that of an original view from the plurality of relations obtained by dividing the original relation.

In this manner, the database restructuring system 17 provides a function of converting the designated relation into the third normal form relation in accordance with a functional dependency. This function is realized by a relation normalization process 171, a functional dependency determination process 172, a relation division process 173, and a view formation process 174.

The relation normalization process 171 calls the functional dependency determination process 172 to determine a functional dependency between attributes. The functional dependency determination process 172 refers to the values of designated attributes from the database to check whether the attributes have a functional dependency. The functional dependency determination process 172 calls the relation division process 173 to divide the relation into a plurality of relations. When the same view as that of the original relation from the plurality of relations obtained by dividing the original relation is to be formed, the view formation process 174 is called.

The relation normalization processing of the database restructuring system will be described below with reference to FIG. 6. FIG. 6 shows the flow of the relation normalization processing of the database restructuring system. In FIG. 6, steps A101 to A109 represent a process of normalizing a first normal form relation into a second normal form relation, and steps A111 to A117 represent a process of normalizing the second normal form relation into a third normal form relation.

In step A101, a candidate key of a designated relation is examined in response to a request of a database manager who uses the terminal 12. In this case, the relation normalization process 171 asks for the system catalogue of the database. As a result, an attribute set serving as a main key can be detected. It is to determine checked whether the attribute values of all the tuples are different from each other in an arbitrary subset of an attribute set serving as the complementary set of the main keys and in a union between an arbitrary proper subset of the main keys and an arbitrary subset of the attribute set serving as the complementary set of the main keys. For example, when main keys of a relation R having an attribute set consisting of A, B, C, D, E, F, and G are A, B, and C, a combination for searching a candidate key is shown in FIG. 7. When attribute values of all the tuples are different from each other in an attribute set, this attribute set is a candidate key. After all the candidate keys are found, the complementary set of the union of the candidate keys is a set of non-key attributes. The candidate keys and the non-key attributes which are found as described above are stored as key attribute information.

The arrangement of hardware, applied to detect the above candidate keys, for comparing attribute values with each other is shown in FIG. 8. The hardware shown in FIG. 8 is hardware of the host computer 11 shown in FIG. 5. The same reference numerals as in FIG. 5 denote the same constituent elements in FIG. 8. In this case, the CPU 13 is constituted by a data cache 131, registers 132A and 132B, a comparator 133, a controller 134, and an instruction cache 135. A flag 134a for storing the comparison result of attribute values as "1" or "0" is arranged in the controller 134.

A comparing operation in the above arrangement, e.g., a case wherein attribute values 1 and 2 stored in the main memory 14 are compared with each other to check whether these values are different from each other, will be described below. In the CPU 13, the controller 134 outputs a data fetch instruction to a bus 18 through the instruction cache 135. In response to the data fetch instruction, the attribute values 1 and 2 in the main memory 14 are loaded in the data cache 131 through the bus 18. After the attribute values 1 and 2 loaded in the data cache 131 are loaded in the registers 132A and 132B, respectively, the values 1 and 2 are compared with each other in the comparator 133. The controller 134 stores the comparison result in the flag 134a.

The comparing operation performed by the above arrangement is applied to not only step A101 but also various processes.

Referring back to the flow chart in FIG. 6, in step A103, the relation normalization process 171 forms arbitrary combinations between arbitrary proper subsets of the candidate keys and the non-key attributes with reference to the key attribute information, the combinations are rearranged from a proper subset of a candidate key having a smaller number of elements, and the combinations are stored as attribute combination information. In FIG. 7, candidate keys of a relation R are only A, B, and C, the attribute combination information is shown in FIG. 9. In FIG. 9, it should be noted that the candidate keys do not appear on the right side of arrows as one attribute. This is because, with respect to a functional dependency, arbitrary combinations between the proper subset of A, B, and C and the subset of D, E, F, and G are covered with the combinations shown in FIG. 9. Since the concept of covering is well known by one skilled in the art as described in Principle of Database System, Chapter 7, J. ULLMAN, translated by Kunii and Oho, Japan Computer Association, a detailed description thereof will be omitted.

In step A105, the relation normalization process 171 calls the functional dependency determination process 172 to check whether the combination at the beginning of the attribute combination information has a functional dependency. When the functional dependency determination process 172 receives, e.g., a combination A → D, the functional dependency determination process 172 performs the following SQL to check whether the attribute D is functionally dependent on the attribute A:

```
select A, count (distinct D)
from R
group by A
having count (distinct D) > 1
```

If only one tuple cannot be retrieved upon completion of this SQL, the attribute D is functionally dependent on the attribute A; if a tuple can be retrieved, the attribute D is not functionally dependent on the attribute A. When the attribute D is functionally dependent on the attribute A, the combination A → D is stored as dependency information. Thereafter, the combination A → D and combinations AB → D and CA → D each of which has D and the superset of A on the right and left sides of the arrow are deleted from the attribute combination information, because the following fact can be derived by the system of axioms of Armstrong (see Principle of Database System, Chapter 7, J. ULLMAN, translated by Kunii and Oho, Japan Computer Association).

That is, if the combination A → D has a functional dependency, the combinations AB → D and CA → D have functional dependencies. The combination A → D does not have a functional dependency, the combination A → D is deleted from the attribute combination information. Step A105 is repeated until the elements of the attribute combinations are eliminated.

In step A107, in the dependency information, a union of the attribute sets on the left side of all combinations having the same attribute set on the right side of the arrows is calculated. When this calculation result coincides with the candidate keys, these combinations are deleted from the dependency information. When the result does not coincide with the candidate keys, the combinations are replaced with a combination having a union of the attribute sets on the right side of the combinations and a union of attribute sets on the left side of the combinations on both the sides of the arrows.

After above operation, in the step A07, a union of the attribute sets on the right side of all combinations having the same attribute set on the left side of the arrows is calculated, and the combinations are replaced with the combination having the union of attribute sets on the right side of the combinations and the union of attribute sets on the left side of the combinations on both the sides of the arrows.

For example, when the following dependency information:

A → D

A → E

A → G

AB → F

BC → F is obtained in step A1105, the union of the attribute sets AB and BC on the left side of the arrows of the combinations AB → F and BC → F is calculated. This calculation result is ABC. Since the result coincides with the candidate keys, the combinations AB → F and BC → F are deleted from the dependency information. The union of the attribute sets D, E, and G on the right side of the combinations A → D, A → E, and A → G having the attribute A on the left side of the arrows is calculated. Since this calculation result is DEG, the combinations A → D, A → E, and A → G are replaced with a combination A → DEG. As a result, the dependency information is given by:

A → DEG

In step A109, the relation division process 173 is called to divide a relation using the functional dependency of the combination at the beginning of the dependency information. The relation division process 173 divides the initial relation into a projection to attribute sets each having a functional dependency and a projection to attribute sets except for non-key attributes each having a functional dependency.

For example, the relation division process 173 performs the following SQL to divide a relation R using the functional dependency A → DEG. In this case, newly formed relations are represented by S and T, and the data type of the attribute set A is represented by TYPE (A).

```
create table S
        (ATYPE (A),
        BTYPE (B),
        CTYPE (C),
        FTYPE (F));
insert into S (A, B, C, F)
    select A, B, C, F
    from R;
create table T
        (ATYPE (A),
        DTYPE (D),
        ETYPE (E),
        GTYPE (G));
insert into T (A, D, E, G)
    select A, D, E, G
    from R;
drop table R;
```

Information of a manner of dividing the initial relation by the SQL is stored as division information. After the initial relation is divided, key dependency information is formed to each of the relations, the functional dependency at the beginning of the dependency information is removed. Step A109 is repeated until the dependency information is eliminated.

In step A111, the following processing is performed to a relation having two or more non-key attributes with reference to key attribute information related to each of the relations. Combinations between proper subsets of arbitrary non-key attribute sets and attributes serving as the elements of the complementary sets of the non-key attribute sets are formed with reference to the key attribute information, the combinations are rearranged from a combination including a set having a smaller number of elements, and the rearranged combinations are stored as attribute combination information. Since only the relation T has two or more non-key attributes after the above dividing operation is performed, the combination information of the relation T is as follows:

D→E

D→G

E→D

E→G

G→D

G→E

DE→G

EG→D

GD→E

In this attribute combination information, only one attribute appears on the right side of each arrow because of the reason described in step A103.

In step A113, the functional dependency determination process 172 is called to check whether the combination at the beginning of the attribute combinations formed in step A111 has a functional dependency. When the functional dependency determination process 172 receives, e.g., an attribute combination D → E, the functional dependency determination process 172 performs the following SQL to check whether the attribute E is functionally dependent on the attribute D:

```
select D, count (distinct E)
from T
group by D
having count (distinct E) > 1;
```

If only one tuple cannot be retrieved upon completion of this SQL, the attribute E is functionally dependent on the attribute D; if a tuple can be retrieved, the attribute E is not functionally dependent on the attribute D. When the attribute E is functionally dependent on the attribute D, the combination D → E is stored as dependency information. Thereafter, the combination D → E and the combination GD → E which has E and the superset of E on the right and left sides of the arrow are deleted from the attribute combination information. In addition, the combination EG → D which has D and the superset of E on the right and left sides of the arrow is deleted. Step A113 is repeated until the elements of the attribute combinations are eliminated.

In step A115, in the dependency information, when the attribute set on the right side of the arrow of a functional dependency X is the proper subset of the attribute set on the left side of the arrow of another functional dependency Y, the functional dependency is converted using the system of axioms of Armstrong so as to prevent the attribute set on the right side of the arrow of the functional dependency X from appearing on the left side of the arrow of the functional dependency Y.

For example, when dependency information:

D → E

E → G is obtained in step A113, the attribute E on the right side of the functional dependency D → E is equal to the attribute on the left side of the other functional dependency E → G. For this reason, the functional dependency E → G is replaced with the functional dependency D → G using the system of axioms of Armstrong (transitive law). Dependency information obtained as a result is as follow:

D → E

E → G

In step A117, the relation division process 173 is called to divide a relation using the functional dependency at the beginning of the dependency information. The relation division process 173 divides the initial relation into a projection to attribute sets each having a functional dependency and a projection to attribute sets except for attributes on the right side of the arrows of functional dependencies.

For example, in order to divide the relation S (A, D, E, G) by the functional dependency D → E, a relation division process performs the following SQL:

```
create table U
        (ATYPE (A),
        DTYPE (D),
        GTYPE (G));
insert into U (A, D, G)
    select A, D, G
```

```
            from S;
        create table V
                (DTYPE (D),
                 ETYPE (E),
        insert into V (D, E)
            select D, E
            from S;
        drop table S;
```

Information of a manner of dividing the initial relation by the SQL is stored as division information. The functional dependency at the beginning of the dependency information is removed. Step A117 is repeated until the dependency information is eliminated.

In step A119, the view formation process 174 is called to form the same view as that of the relation which is not divided from the set of the divided relations. The view formation process 174 forms the same view as that of the initial relation with reference to the division information. For example, in order to form the same view as that of the initial relation R from the above divided relations T (A, B, C, F), U (A, D, G), V (D, E), the following SQL is performed:

```
        create view R (A, B, C, D, E, F, G) as
            select T. A, T. B, T. C, U. D, V. E,
                T. F, U. G
            from T, U, V
            where T. A - U. A & U. D - V. D;
```

In this manner, the division of the relation can be transparent to a user.

The procedure of the relation normalization processing has been described above. The procedure of normalization will be described below in detail using the relation shown in FIG. 2 as an example.

The relation normalization process 171 inquires of a system catalogue a system catalogue information related to the attributes of a relation <personnel and allowance>. As a result, it is determined that a combination of attributes <employee number, month> is a main key. The attribute values of combinations of attributes serving as elements of a union between subsets of (name, section, location, salary) and direct products of subsets of (name, section, location, salary) and a proper subset of (employee number, salary) are examined. As a result, it is determined that there is no combination of attributes including tuples having different attribute values. Therefore, in the relation <personnel and allowance>, the main key is only a candidate key, (name, section, location, month) is a non-key attribute set.

In the relation normalization process 171 forms combinations of (employee number) and (month) serving as the proper subsets of the candidate keys (employee number, month) and (name), (section), (location), and (salary) serving as non-key attributes. As a result, the following combinations can be obtained:

```
        employee number → name
        employee number → section
        employee number → location
        employee number → salary
            month → name
            month → section
            month → location
```

```
            month → salary
```

Whether the functional dependency of the combination "employee number → name" at the beginning of the attribute combination information described above has a functional dependency is checked using the functional dependency determination process 172. The functional dependency determination process 172 inquires the following SQL of the database management system.

```
        select employee number, count (distinct name)
        from personnel allowance
        group by employee number
        having count (distinct name) > 1
```

This question is ended without selecting one tuple. Therefore, an attribute <name> is functionally dependent on an attribute <employee number>. For this reason, "employee number → name" is stored in the dependency information, and "employee number → name" is deleted from the attribute combination information. It is checked whether a combination "employee number → section" at the beginning of new attribute combination information has a functional dependency. It is checked whether each of all the combinations of the attribute combination information has a functional dependency. As a result, the following dependency information can be obtained:

employee number → name employee number → section employee number → location

In the dependency information, these combinations have different attributes on the right side of the arrows. Since the combinations have the same attribute <employee number> on the left side of the arrows, these combinations are replaced with a combination "employee number → name-.section.location" constituted by a union (employee number) of the left-side attributes and a union (name, section, location) of the right-side attributes. That is, the following dependency information is derived:

employee number → name.section.location

A relation is divided using the dependency information. Therefore, the relation division process 173 performs the following SQL.

```
        create table personnel
            (employee number NUMBER,
             name CHARACTER,
             section CHARACTER,
             location CHARACTER);
        insert into personnel (employee number, name,
                section, location)
            select employee number, name, section,
                location
            from personnel and allowance;
        create table allowance
            (employee number NUMBER,
             month DATE,
             salary NUMBER);
        insert into allowance (employee number, month,
```

-continued

```
        salary)
    select employee number, month, salary,
        from personnel and allowance;
    drop table personnel and allowance;
```

Figures 10, 11, 12:
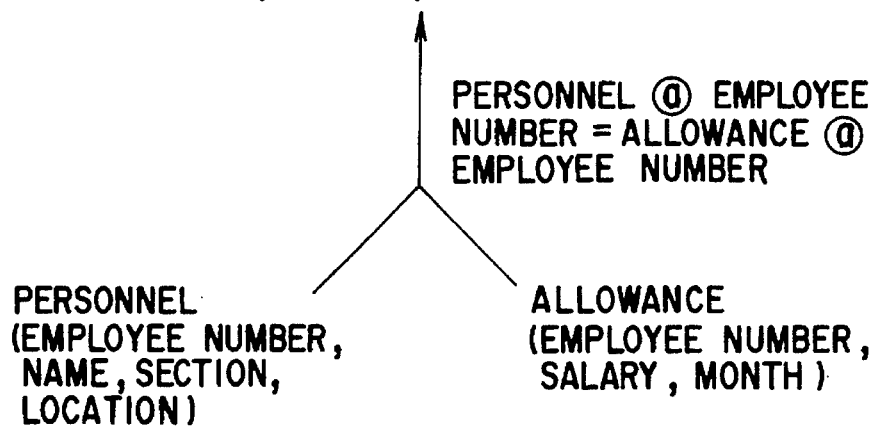
FIG. 10 is a view showing division information in the embodiment.
FIG. 11 is key attribute information in the embodiment.
FIG. 12 is an execution result of an SQL in the embodiment.

A result obtained by performing this SQL is shown in FIGS. 3A and 3B. Division information is shown in FIG. 10, and key attribute information of divided relations is shown in FIG. 11. Thereafter, in the dependency information:

employee number → name.section.location

"employee number → name.section.location" is deleted. Therefore, there is no dependency information.

Since the relation <allowance> has only one non-key attribute, the relation <personnel> is to be processed. Since the non-key attributes of the relation <personnel> are (name, section, location), the following attribute combination information is formed by the non-key attributes:

```
            name → section
            name → location
            section → location
            section → name
            location → name
            location → section
        name.section → location
        name.location → section
        section.location → name
```

The functional dependency determination process 172 performs the following SQL to the combination "name → section" at the beginning of the attribute combination information.

```
    select name, count (distinct section)
    from personnel
    group by name
    having count (distinct section) > 1;
```

A result obtained by performing this SQL is shown in FIG. 12. In this case, since a tuple is retrieved, "section" is not dependent on "name". For this reason, "name → section" is deleted from the attribute combination information.

Thereafter, it is checked whether the combination "name → location" at the beginning of the new attribute combination information has a functional dependency. As a result, this combination has no functional dependency. For this reason, the combination is deleted from the attribute combination information.

Thereafter, it is checked whether the "section → location" at the beginning of the new combination information has a functional dependency. In this case, since the combination has a functional dependency, the combination "section → location" is stored as dependency information. The combination "section → location" and the combination "name.section → location" having "location" on the right side of the arrow and a superset {name, section} of "section" on the left side of the arrow are deleted from the attribute combination information. In addition, "location → section" and "name.location → section" are deleted. Attribute combination information obtained by deleting the above combinations is as follows:

```
            section → name
            location → name
        section.location → name
```

In addition, the processing as described above is performed to the above combination of attribute combination information.

As a result of the above processing, the dependency information includes only the following combination:

section → location

The relation <personnel> is divided using this dependency information. In this case, the relation division process 173 performs the following SQL:

```
    create table employee
        (employee number NUMBER,
        name CHARACTER,
        section CHARACTER);
    insert into employee (employee number, name,
            section)
        select employee number, name
            section
        from personnel;
    create table organization
        (section CHARACTER;
        location CHARACTER);
    insert into organization (section, location)
        select section, location
        from personnel;
    drop table personnel;
```

A result obtained by performing this processing is shown in FIGS. 4A and 4B. In addition, the division information is stored and "section → location" is deleted from the dependency information. In this manner, the functional dependency information is eliminated, and the dividing operation of the relation is completed.

Finally, the same view as that of the initial relation <personnel and allowance> is formed from the relations <employee>, <organization>, and <allowance>. The view formation process 174 performs, using the division information, the following SQL:

```
    create view personnel and allowance (employee
number,
                        name, section,
                        location, salary,
                        month) as
        select employee. employee number,
            employee. name,
                        employee. section,
                        organization.
                        location, allowance.
                        salary, allowance.
                        month
            from employee, organization, allowance
            where employee. employee number =
                        allowance. employee number &
                        employee. section =
                        organization. section;
```

Therefore, the division of the relation is transparent to a user.

As described above, in this embodiment, the following nature is used. That is, a proposition that an attribute set B is functionally dependent on an attribute set A is defined as a proposition X, and the following proposition is defined as a proposition Y: if there are a plurality of tuples having equal values in the attribute set A, then the values of the attribute set B of the tuples are equal to each other. In this case, when a relation has a larger number of tuples, if the proposition Y is true, the proposition X is probably true. The values of an attribute set to be determined are used as a means for determining a functional dependency.

For this reason, a functional dependency can be determined, and a table can be divided using the functional dependency as a parameter. Therefore, a third normal form relation can be formed by a first normal form relation.

As has been described above, according to the present invention, even when a database manager does not recognize that a relation is not a third normal form relation, a functional dependency between attributes of the relation is found out, and the relation can be normalized by dividing the relation. Therefore, even when a relation having no third normal form is defined during database designing, an area for storing relations can be decreased without losing information, and the number of tuples to be updated in an updating operation can be decreased.

Figure 13:
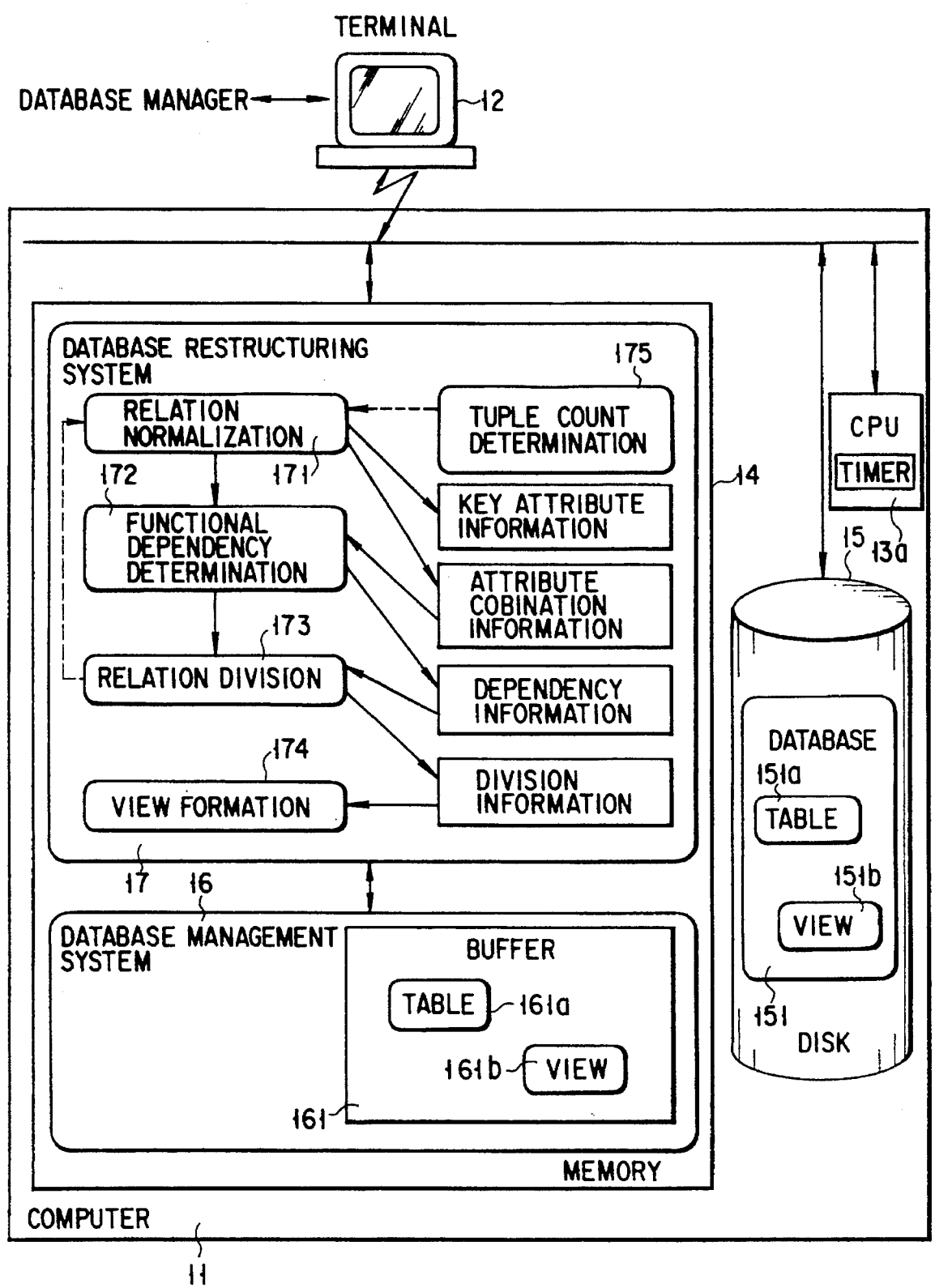
FIG. 13 is a block diagram showing the arrangement of a database system according to the second embodiment of the present invention.

The second embodiment according to the present invention will be described below. FIG. 13 shows the arrangement of a database system according to the second embodiment of the present invention. The same reference numerals as in FIG. 5 denote constituent elements shown in FIG. 13 and operating as elements of the database system shown in FIG. 5, and a description thereof will be omitted.

In FIG. 13, a timer 13a used for detecting the laspe of a predetermined time. For this reason, the CPU 13 performs a timer interrupt every predetermined time on the basis of the timer 13a.

Figure 14:
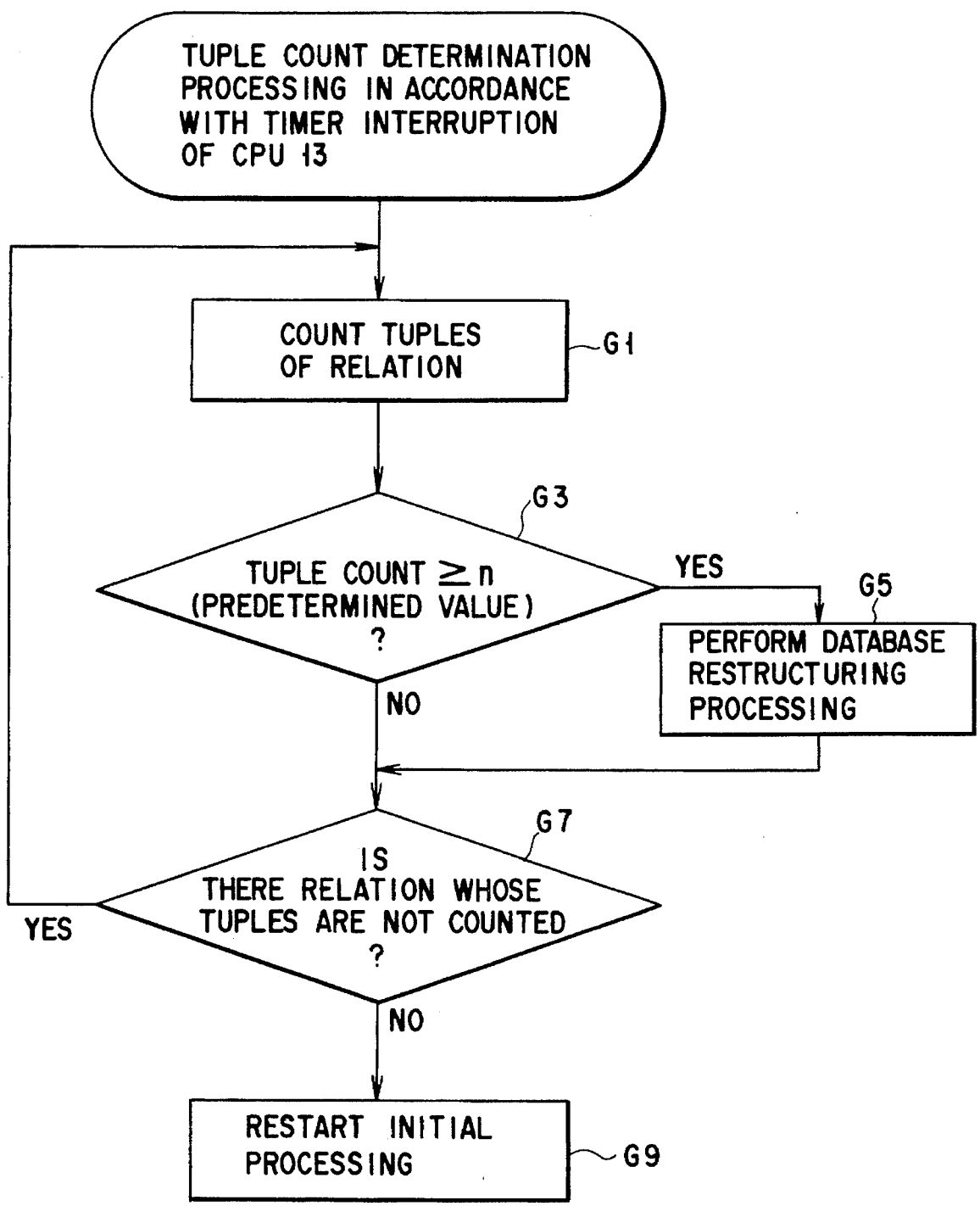
FIG. 14 is a flow chart for explaining unnormalized tuple count determination processing in response to a timer interrupt of a CPU 13.

A relation normalization process 171, a functional dependency determination process 172, a relation division process 173, a view formation process 174, and a tuple count determination process 175 are stored in a database restructuring system 17. The tuple count determination process is called in response to a timer interrupt performed by the CPU 13, and performs processing shown in the flow of FIG. 14.

Tuples of relations which are not normalized are counted in response to a timer interrupt in the CPU 13 (step G1). At this time, a management table or the like indicating whether relations which are formed in advance are normalized is used. It is checked whether the number of the counted tuples is a predetermined value n (tuple count) or more (step G3). When the calculated tuple count is the predetermined value n or more in step G3, the relation having this tuple count is subjected to database restructuring processing shown in FIG. 6. In addition, when the calculated tuple count is smaller than the predetermined value n in step G3, it is checked whether there is a relation having tuples which are not counted (step G7).

When there is a relation having tuples which are not counted in step G7, the processing started from step G1 is performed again. If processing from steps G1 to G5 is performed to all the relations in step G7, initial processing which is performed before the timer interrupt is restarted.

Since the database restructuring processing in the above processing is the same as the processing explained in the first embodiment with reference to FIG. 6, a description of the database restructuring processing will be omitted.

As described above, according to the second embodiment of the present invention, even when a relation having no third normal form is defined during database designing, normalization of the relation is performed in response to a request of the database manager. In addition, even when the tuple count of a relation which is not normalized is a predetermined value or more, the normalization of the relation is automatically performed to the relation. Therefore, an area for storing relations can be decreased without losing information, and the number of tuples to be updated in an updating operation can be decreased.

Note that, the precision (probability that determination is correct) of determination of a functional dependency in a relation having a large number of tuples is high. For this reason, when a request for normalizing the relation is made by a database manager, a means for counting tuples of the relation and rejecting the request when the number of tuples is small may be used.

The third embodiment of the present invention will be described below. FIG. 15 shows the arrangement of a database system according to the third embodiment of the present invention. The same reference numerals as in FIG. 5 denote constituent elements shown in FIG. 15 and operating as elements of the database system shown in FIG. 5, and a description thereof will be omitted.

In FIG. 15, a relation normalization process 171, a functional dependency determination process 172, a relation division process 173, a view formation process 174, and a first normal form conversion process 176 are stored in a database restructuring system 17. The first normal form conversion process 176 is called when restructuring of a database is requested by a database manager. When relations in the database include a non-normal form, the non-normal form is converted into a first normal form.

Figure 16:
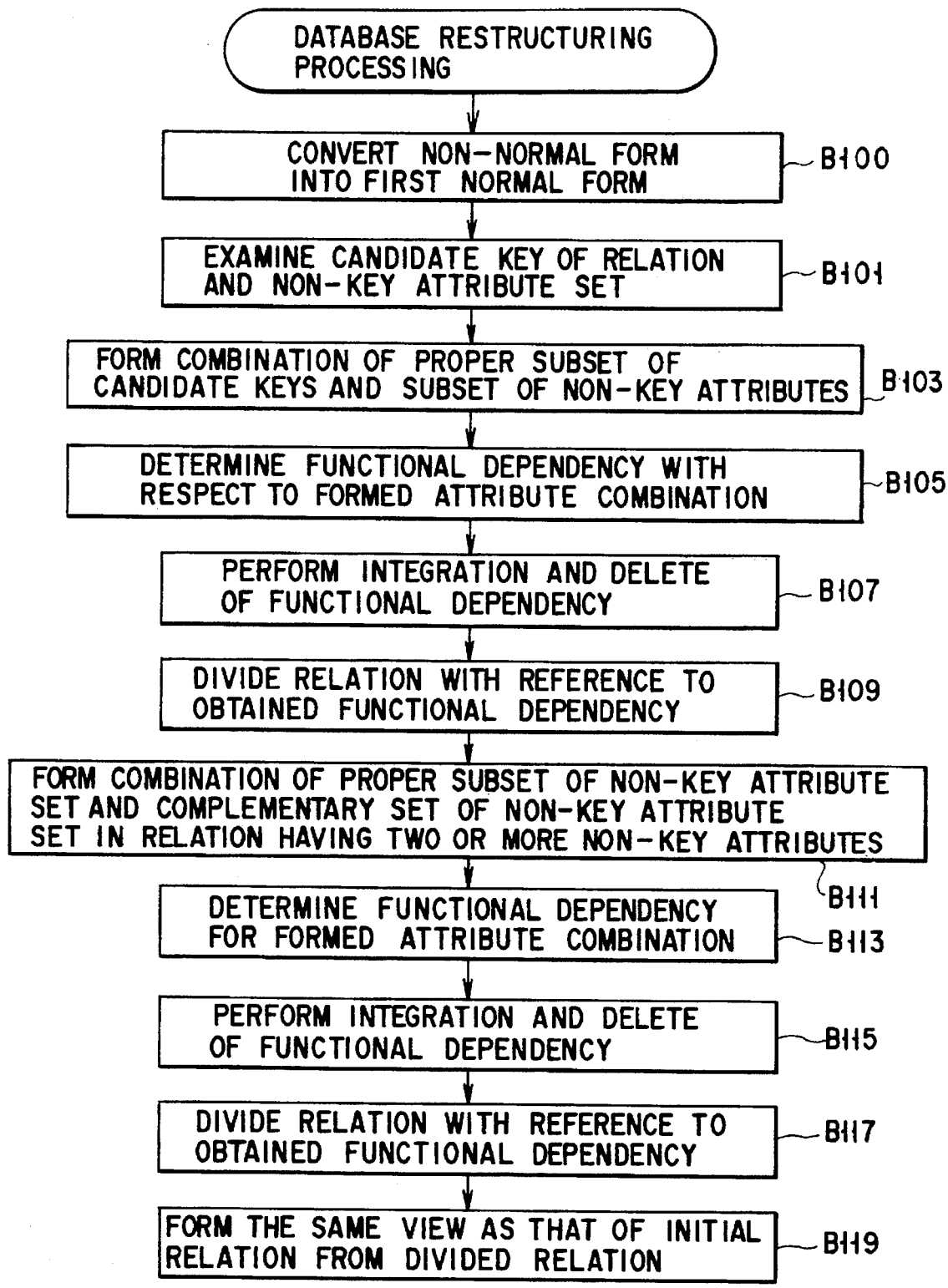
FIG. 16 is a flow chart for explaining database restructuring processing in the arrangement of the third embodiment of the present invention.

The database restructuring processing in the above arrangement is shown in the flow of FIG. 16. Note that since steps B101 to B119 in FIG. 16 correspond to steps A101 to A119 shown in FIG. 6, respectively, a description thereof will be omitted.

When the database restructuring processing is performed in response to the request of the database manager, the first normal form conversion process 176 is called first, and it is checked whether there is a relation having a non-normal form. If there is the relation having the non-normal form, the non-normal form is converted into a first normal form (step B100). Subsequently, the processing from steps B101 to B119 is performed.

Note that, a non-normal form relation in a relation in which the value of an attribute is a set value. Since it is difficult to automatically determine the non-normal form relation, an attribute having values separated by a space or a comma (,) is found, the attribute is presented to a database manager, and the attribute is confirmed by the database manager.

As described above, according to the third embodiment of the present invention, even when a relation having no third normal form is defined during database designing, in response to a request of the database manager, the relation is normalized such that its first normal form is converted into a third normal form. In addition, even when a relation having a non-normal form which is not a first normal form is defined during database designing, the normalization of the relation is performed. Therefore, an area for storing relations without losing information, the number of tuples to be updated in an updating operation can be decreased.

The fourth embodiment of the present invention will be described below. Since the database system according to the fourth embodiment has the same arrangement as that shown in FIG. 5, a description of the constituent elements of the database system according to the fourth embodiment will be omitted. However, processes 171 to 174 stored in a database restructuring system 17 are called on the basis of an interactive form between a database and a database manager who requests the database to be restructured, and are performed.

Figure 17:
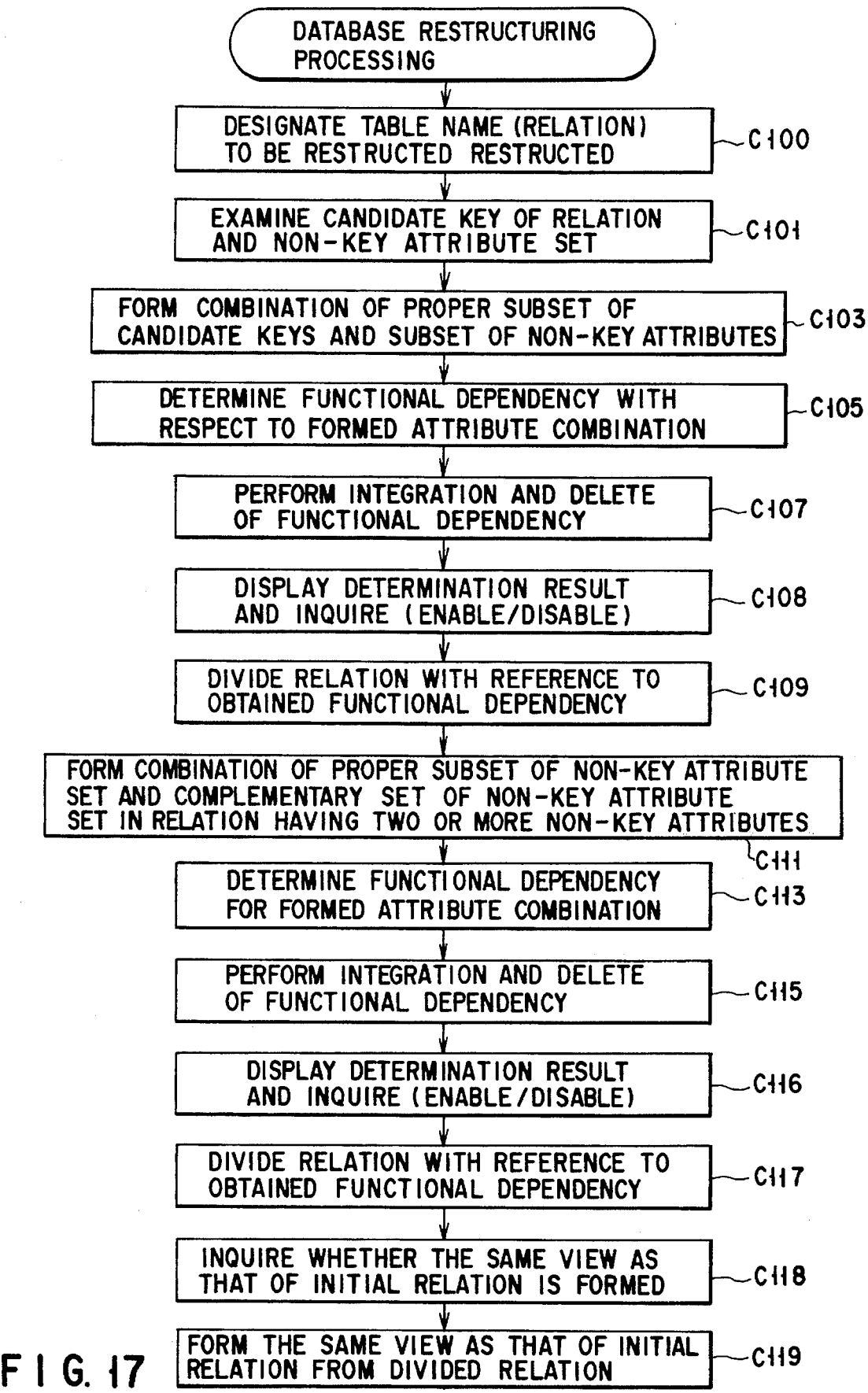
FIG. 17 is a flow chart for explaining database restructuring processing performed by an interactive method of the fourth embodiment of the present invention.

Database restructuring processing performed by the interactive form is shown in the flow of FIG. 17. When the database manager requests the database to be restructured using a terminal 12, a table (relation) subjected to the restructuring processing is inquired, and the database manager designates the table (step C100). Subsequently, in accordance with the designation, processing in steps C101 to C107 is performed to the table (relation) subjected to the restructuring processing to form dependency information. Since the processing in steps C101 to C107 corresponds to the processing in steps A101 to A107 of the flow chart shown in FIG. 6, a detailed description thereof will be omitted.

The dependency information (determination result) formed in step C107 is displayed on the display unit of the terminal 12 which is used by the database manager. In addition, the database manager is inquired about enable/disable, i.e., whether a relation is divided on the basis of the dependency information (step C108). When the database manager sends an instruction (enable/disable) related to the division, the relation is divided in accordance with the instruction (step C109). Note that, since the processing in step C109 is the same as that in step A109 shown in FIG. 6, a detailed description thereof will be omitted.

In this manner, the database manager can recognize that the first normal form relation is divided into what types of second normal form relations.

In step C109, the divided and formed second normal form relations are subjected to processing in steps C111 to C115, thereby forming dependency information for the second normal form. Since the processing in steps C111 to C115 is the same as that in steps A111 to A115 shown in FIG. 6, a detailed description thereof will be omitted.

The dependency information (determination result) formed in step C115 is displayed on the display unit of the terminal used by the database manager. In addition, the database manager is inquired about enable/disable, i.e., whether each relation is divided on the basis of the dependency information (step C116). When the database manager sends an instruction (enable/disable) related to the division, the relation is divided in accordance with the instruction (step C117). Note that, since the processing in step C117 is the same as that in step A117 shown in FIG. 6, a detailed description thereof will be omitted.

In this manner, the database manager can recognize that each of the second normal form relations is divided into what types of third normal form relations.

Upon the processing in step C117, in step C118, the database manager is inquired about whether the same view as that of the initial relation is formed. When the database manager requests the same view as that of the initial relation to be formed, the same view as that of the initial relation is formed in step C119. Since the processing in step C119 is the same as that in step A119 shown in FIG. 6, a detailed description thereof will be omitted.

As described above, according to the fourth embodiment of the present invention, even when a relation having no third normal form is defined while a database is designed, in response to a request of a database manager, the relation can be normalized such that its first normal form is converted into a third normal form. Therefore, an area for storing relations can be decreased without losing information, and the number of tuples to be updated in an updating operation can be decreased. In addition, in restructuring processing relations, the data manager can recognize that the relations are restructured into what types of relations. For this reason, the relations can be divided on the basis of the intentions of the database manager.

The fifth embodiment according to the present invention will be described below. FIG. 18 shows the arrangement of a database system according to the fifth embodiment of the present invention. The same reference numerals as in FIG. 5 denote constituent elements shown in FIG. 18 and operating as elements of the database system shown in FIG. 5, and a description thereof will be omitted.

In FIG. 18, a relation normalization process 171, a functional dependency determination process 172, a relation division process 173, a view formation process 174, and a Boyce-Codd normalization conversion process 178 are stored in a database restructuring system 17. In this Boyce-Codd normalization conversion process 178, normalization at a level higher than that of a third normal form is performed.

Figure 19:
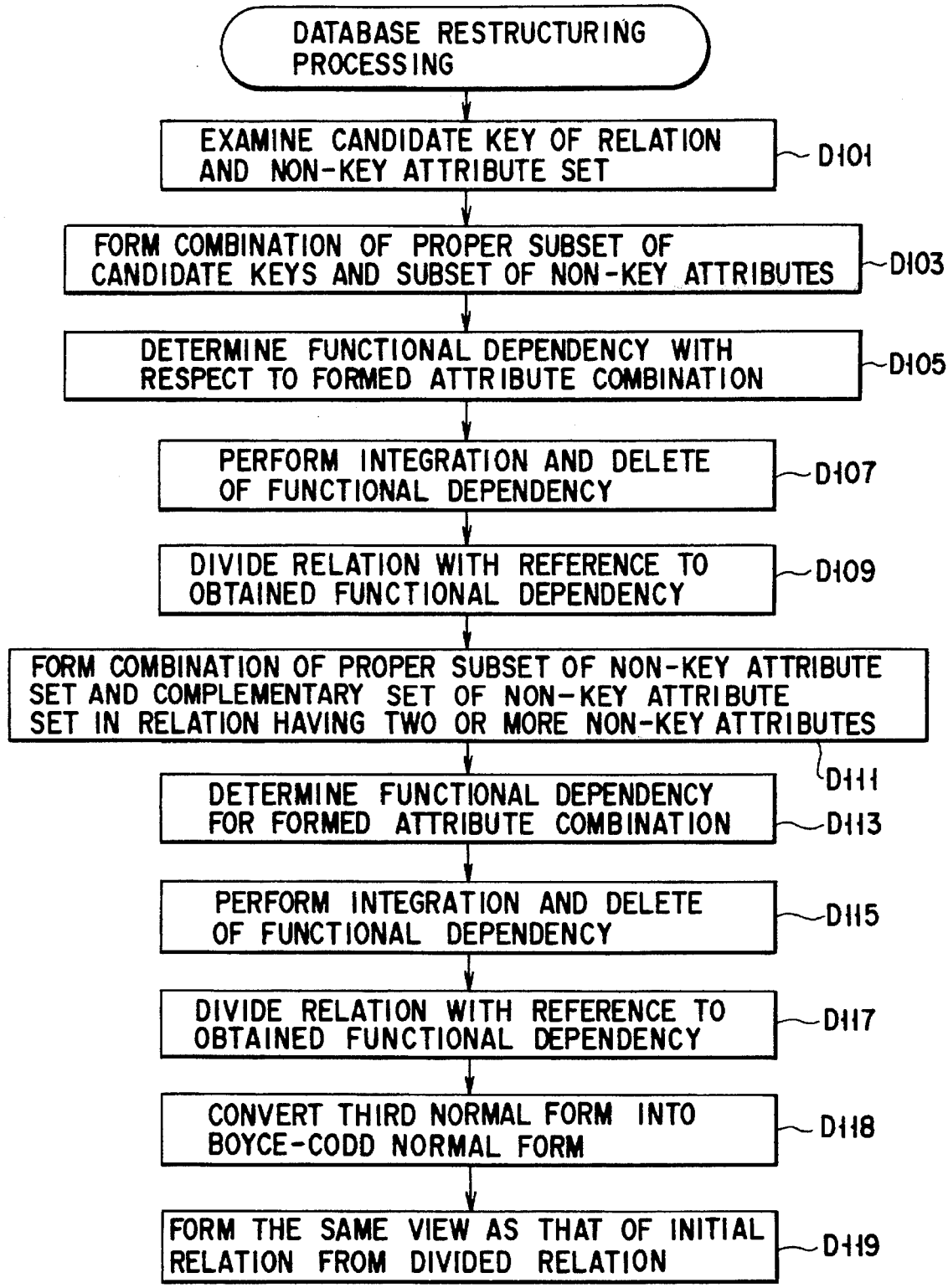
FIG. 19 is a flow chart for explaining database restructuring processing in the arrangement of the fifth embodiment of the present invention.

Database restructuring processing in the above arrangement is shown in the flow of FIG. 19. Note that, since steps D101 to D117 shown in FIG. 19 correspond to steps A101 to A117 shown in FIG. 6, respectively, a description thereof will be omitted.

In step D118, relations normalized to third normal form relations by the processing in steps D101 to D117 are subjected to normalization at a level higher than that of a third normal form. In this manner, each third normal form can be converted into a Boyce-Codd normal form. Thereafter, in step D119, the same view as that of the initial relation is formed from the divided relations. Since the processing in step D119 is the same as that in step A119 shown in FIG. 6, a detailed description thereof will be omitted.

As described above, according to the fifth embodiment of the present invention, even when a relation having no third normal form is defined during database designing, normalization of the relation from the first normal form to the Boyce-Codd normal form can be performed in response to a request of the database manager. When a third normal form is converted into a Boyce-Codd normal form, an area for storing a relation is increased. An effect of converting the third normal form into the Boyce-Codd normal form is that one relation represents one. For example, a phenomenon in which, when a fact is changed, another fact disappears (updating abnormality) does not occur.

The sixth embodiment of the present invention will be described below. FIG. 20 shows the arrangement of a database system according to the sixth embodiment of the present invention. The same reference numerals as in FIG. 5 denote constituent elements shown in FIG. 20 and operating as elements of the database system shown in FIG. 5, and a description thereof will be omitted.

In FIG. 20, various relational database operations such as retrieval/updating of a relational database 151 of a magnetic disk device 15 are provided to a database manager by a database management system 16 using a data manipulation language, and the database management system 16 stores an updating abnormality detection process 162.

In the updating abnormality detection process 162, an abnormality occurring while relations are updated by the database management system 16 is detected, and the abnormality during an updating operation is informed to a database restructuring system 17.

The database restructuring system 17 stores an updating abnormality correspondence process 179, and the database is restructured in response to not only a request of the database manager but also information of abnormality detection during updating.

Database restructuring processing in the above arrangement is shown in the flow of FIG. 21. Since steps E101 to E119 in FIG. 21 correspond to steps A101 to A119 shown in FIG. 6, respectively, a description thereof will be omitted.

In the database management system, when an updating abnormality in a relation occurs, the updating abnormality detection process 162a detects the updating abnormality. In addition, the updating abnormality detection process 162a informs the database restructuring system 17 that the abnormality has occurred during updating. In the database restructuring system 17, database restructuring processing in steps E101 to E119 is performed in response to this informing operation.

As described above, according to the sixth embodiment of the present invention, even when a relation having no third normal form is defined during database designing, in response to a request of a database manager or updating abnormality in the relation, the relation is normalized such that its first normal form is converted into a third normal form. Therefore, an area for storing relations can be decreased without losing information, and the number of tuples to be updated in an updating operation can be decreased.

Figure 22:
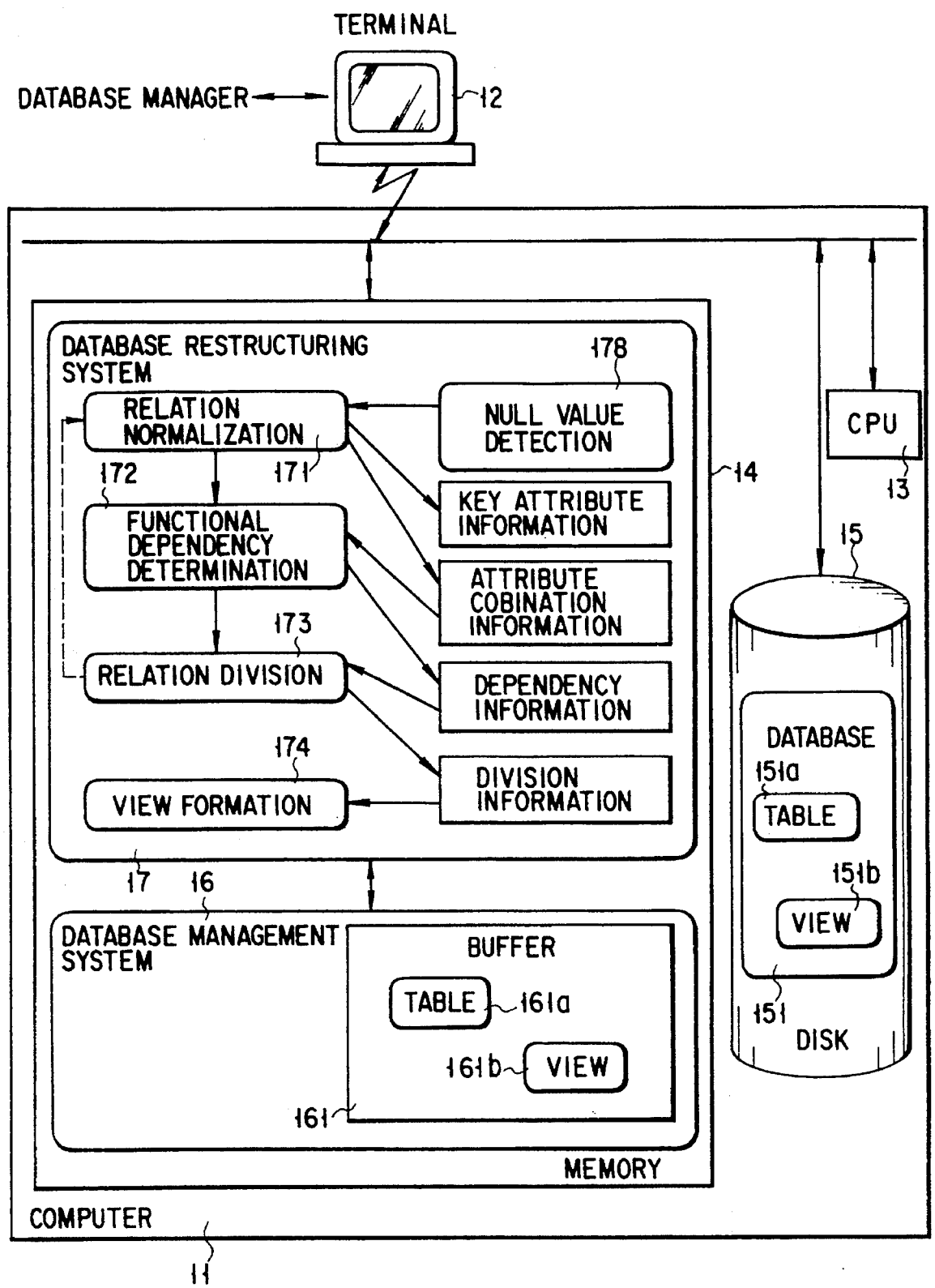
FIG. 22 is a block diagram showing the arrangement of a database system according to the seventh embodiment of the present invention.

The seventh embodiment of the present invention will be described below. FIG. 22 shows the arrangement of a database system according to the seventh embodiment of the present invention. The same reference numerals as in FIG. 5 denote constituent elements shown in FIG. 22 and operating as elements of the database system shown in FIG. 5, and a description thereof will be omitted.

In FIG. 22, a relation normalization process 171, a functional dependency determination process 172, a relation division process 173, a view formation process 174, and a null value detection process 178 are stored in a database restructuring system 17. The null value detection process 178 is called in database restructuring processing, detects a null value in attribute values of the database, and eliminates attributes having the detected null values from attributes to be normalized.

Figure 23:
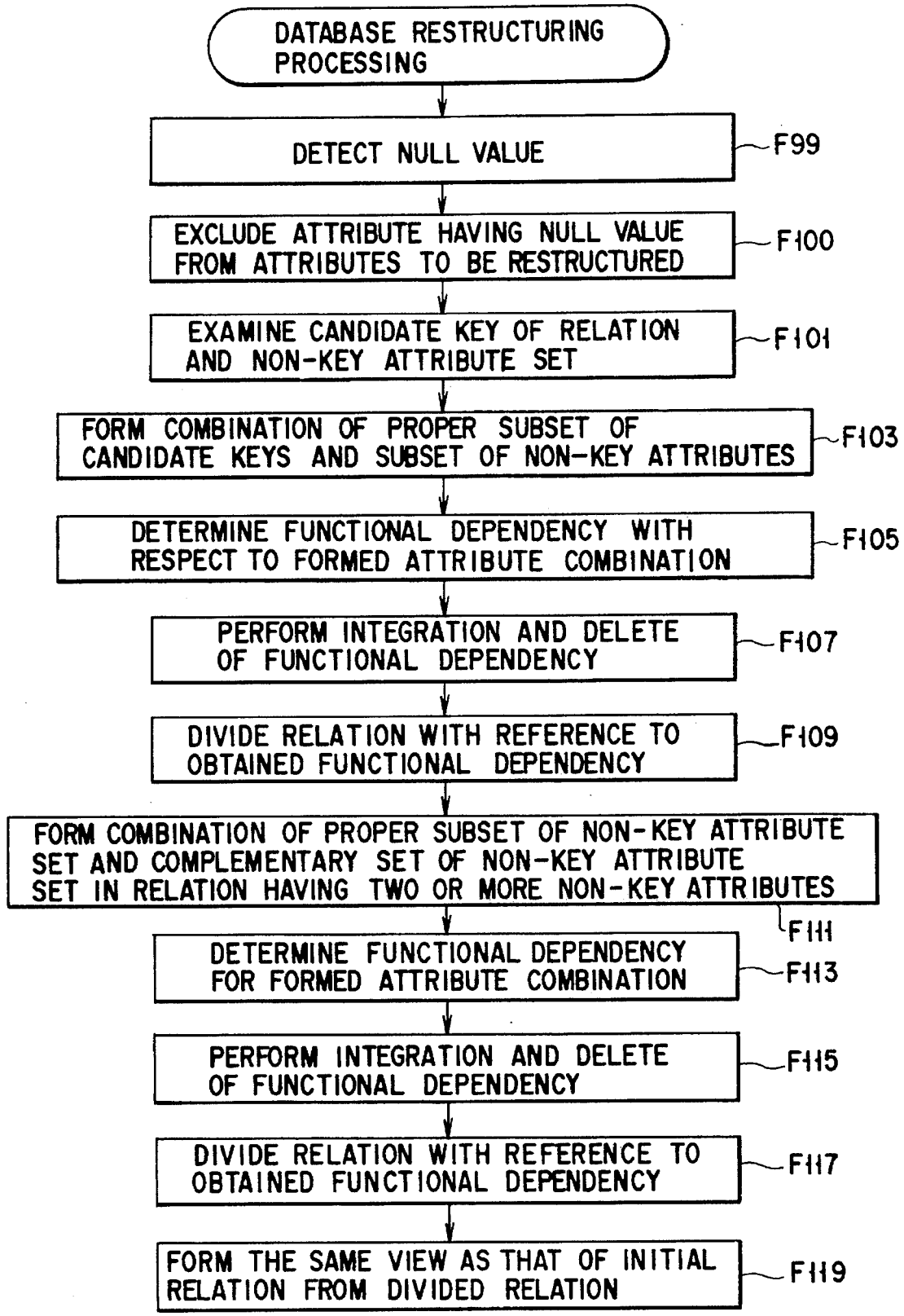
FIG. 23 is a flow chart for explaining database restructuring processing in the above arrangement of the seventh embodiment of the present invention.

Database restructuring processing in the above arrangement is shown in the flow of FIG. 23. Note that since steps F101 to F119 in FIG. 23 correspond to steps A101 to A119 shown in FIG. 6, respectively, a description thereof will be omitted.

When the database is restructured in response to a request of the database manager, a null value detection process is called first, and it is detected whether attribute values of relations have a null value (step F99). In this case, when the null value is detected, an attribute having the detected null value is eliminated from attributes to be restructured (step F100). The processing in steps F101 to F119 is performed on the basis of the attributes except for the attribute eliminated in step F100.

As described above, according to the seventh embodiment of the present invention, even when a relation having no third normal form is defined during database designing, in response to a request of a database manager, the relation is normalized such that its first normal form is converted into a third normal form. At this time, an attribute having a null value is eliminated from attributes to be restructured. For this reason, when relations are defined by only the database manager, processing for the attribute having an actual value can be omitted, thereby performing high-speed restructuring processing. In other words, an attribute including a null value is not used as at least a candidate key. For this reason, when this attribute is eliminated from candidate keys, combinations of attributes for determining a functional dependency are advantageously decreased in number. Therefore, an area for storing relations can be decreased without losing information, and the number of tuples to be updated in an updating operation can be decreased.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A database restructuring system comprising:

a relational database having at least one relation, each said relation having a plurality of tuples, a set of candidate keys, and a set of non-key attributes;

extraction means for extracting a set of candidate keys and non-key attributes from each said relation of said relational database;

formation means for forming a combination between a proper subset of said candidate keys extracted by said extraction means and a subset of said non-key attributes;

determination means for checking, with reference to values of said tuples which are present in said relation whether said subset of non-key attributes is functionally dependent on said proper subset of candidate keys in each of said combinations, and storing a determination result as dependency information; and division means for dividing said relation into a first relation generated by a projection to an attribute set with non-key attributes having a functional dependency and a second relation generated by a projection to an attribute set without non-key attributes having a functional dependency said division means operating in accordance with said dependency information; and means for checking whether each said relation generated by said division means has at least two non-key attributes, and executing said formation means, said determination means and said division means automatically on each said relation having at least two non-key attributes.

2. A system according to claim 1, wherein said system further comprises at least one terminal, and a host computer having view means for supplying a table visible image based on relations to said terminal.

3. A system according to claim 1, further comprising means for calculating a tuple count of each of said relations of said relational database in response to an interruption signal from a CPU and using a relation having said tuple count as a relation to be restructured when the tuple count is equal to or greater than a predetermined value.

4. A system according to claim 2, wherein said system further comprises means for detecting a predetermined character of attributes of said relation of said relational database, means for informing said terminal by said view means of said detection and inputting an instruction from said terminal, and means for converting a non-normal form into a first normal form in accordance with said input instruction.

5. A system according to claim 1, wherein said extraction means has means for inputting designation of a relation to be restructured from a terminal, and said division means has means for informing said terminal of attribute information generated by said determination means, inputting an enable/disable division instruction from said terminal, and controlling division processing in accordance with said instruction.

6. A system according to claim 1, wherein said system further comprises means for converting each of at least one third normal form relations divided by said division means into a relation having a normal form at a level higher than that of said third normal form.

7. A system according to claim 1, wherein said database management system has detection means for detecting an abnormality occurring when said tuples are updated, and said system further comprises means for using, as a relation to be restructured, a relation related to a tuple in which said abnormality is detected by said abnormality detection means.

8. A system according to claim 1, wherein said system further comprises means for detecting a null value in values of said tuples and eliminating an attribute corresponding to said null value from a relation to be restructured.

9. A relational database restructuring system, having at least one relation, each said relation having a plurality of tuples, a set of attributes, a set of candidate keys and a set of non-key attributes, wherein each said tuple is managed as a two-dimensional relation for each said attribute and wherein each said relation has a candidate key serving as a set of attributes which can uniquely identify one of said tuples, comprising:

first determination means for checking, with reference to values of tuples which are present in said relations, whether a first set of attributes is functionally dependent on a second set of attributes;

division means for dividing a first relation into a second and a third relation by a projecting operation for a designated attribute set;

second determination means for determining, from attribute sets A and B which are included in a relation and are mutually primary, whether said attribute sets A and B satisfy at least one of a first condition and a second condition, said first condition being that said attribute set A is a proper subset of said set of candidate keys and said attribute set B is a subset of a non-key attribute set serving as a subset of said set of candidate keys said second condition being that both the attribute sets A and B are proper subsets of said non-key attribute set; and means for checking whether said attribute set B is functionally dependent on said attribute set A once said second determination means has determined that said attribute sets A and B satisfy at least one of said first condition and said second condition, and dividing said relation including said attribute sets A and B, when said attribute set A is functionally dependent on attribute set B, into a relation formed by a projection to a subset of the attribute set B and, a relation formed by a projection to a union between said attribute sets A and B.

10. A system according to claim 9, wherein said system further comprises at least one terminal and a host computer having view means for supplying a table visible image based on relations to said terminal.

11. A system according to claim 9, wherein said system further comprises means for calculating a tuple count of each relation of said relational database every predetermined time and, if the calculation result is not less than a predetermined value, causing said second determination means to operate a relation having the tuple count.

12. A system according to claim 9, wherein said system further comprises means for detecting a predetermined character of attributes of said relation of said relational database, means for informing said terminal by said view means of said detection and inputting an instruction from said terminal, means for converting a non-normal relation into first normal form in accordance with said input instruction and means for converting, when a relation of said relational database has a non-normal form, said non-normal form into a first normal form in accordance with said input instruction.

13. A system according to claim 9, wherein said division means has means for informing an operator of a result determined by said first determination means, inputting an enable/disable a division instruction from said operator, and controlling division processing in accordance with said instruction.

14. A system according to claim 9, wherein said system further comprises means for converting each of at least one third normal form relations divided by said division means into a relation having a normal form at a level higher than that of said third normal form.

15. A system according to claim 9, wherein said system further comprises means for detecting an abnormality occurring when said tuples are updated and per forming determination processing in accordance with said updating abnormality.

16. A system according to claim 9, wherein said system further comprises means for detecting a null value in values of said tuples and eliminating an attribute corresponding to said null value from relations determined by said first determination means and said second determination means.

17. A method for restructuring a relational database comprising the steps of:

a) extracting an attribute set of candidate keys and non-key attributes except for the candidate keys from a relation to be restructured;

b) forming a plurality of combinations between a proper subset of the candidate keys extracted in said step a) and a subset of said non-key attributes;

c) checking, with reference to values of tuples which are present in said relation, whether said subset of non-key attributes is functionally dependent on said proper subset of candidate keys in each of the combinations formed in said step b), and storing a determination result as dependency information, and storing attribute information representing the determination result; and d) dividing said relation into a relation generated by a projection to an attribute set having a functional dependency and a relation generated by a projection to an attribute set of attributes except for non-key attributes having a functional dependency in accordance with said dependency information;

e) checking whether said relation generated by said division in said step d) has at least two non-key attributes., and executing said formation step b), said determination step c) and said division step d) automatically on said relation when said relation has at least two non-key attributes.

18. A method according to claim 17, wherein the method further comprises a step for supplying a table visible image based on relations to said terminal.

19. A method according to claim 17 further comprising the step of calculating a tuple count of each said relation of said relational database in response to an interruption signal and using a relation having said tuple count as a relation to be structured, when said tuple count is greater than a predetermined value.

20. A method according to claim 18, wherein the method further comprises a step for detecting a predetermined character of attributes of said relation of said relational database, a step for informing a terminal of said detection results, a step for inputting an instruction from said terminal, a step of converting, when a relation to be restructured of said relational database has a non-normal form, said non-normal form into a first normal form in accordance with said instruction.

21. A method according to claim 17, wherein step a) comprises a step of inputting designation of a relation to be restructured from a terminal, and step d) further comprises a step of informing said terminal of attribute information generated in step c), inputting an enable/disable division instruction from said terminal, and controlling division processing in accordance with said instruction.

22. A method according to claim 17, further comprising the step of converting each of at least one third normal form relations divided in step d) into a relation having a form at a level higher than that of third normal form.

23. A method according to claim 17, wherein said database management system has detection means for detecting an abnormality occurring when tuples are updated, and said method further comprises a step of using, as a relation to be restructured, a relation related to a tuple in which said abnormality is detected in accordance with said abnormality detection performed by said detection means.

24. A method according to claim 17, wherein the method further comprises a step of detecting a null value in values of said tuples and eliminating an attribute corresponding to said null value from a relation to be restructured.

25. A method of restructuring a relational database having at least one relation, each said relation having a plurality of tuples, a set of attributes, a set of candidate keys and a set of non-key attributes; wherein each tuple is managed as a two-dimensional relation for each attribute and each relation has a candidate key serving as a set of attributes which can uniquely identify one of said tuples, comprising the steps of:

a) checking, with reference to values of tuples which are present in the relations, whether a first set of attributes is functionally dependent on a second set of attributes;

b) dividing a first relation into a second and a third relation by a projecting operation for a designated attribute set;

c) performing said steps a) and b) in order to determine from attribute sets A and B which are included in said relation and are mutually primary, when said attribute set A is a proper subset of said set of candidate keys and when said attribute set B is a subset of a non-key attribute set serving as a subset of the candidate key; and d) performing said steps a) and b) when said attribute sets A and B are proper subsets of said non-key attribute set in said attribute sets A and B which are mutually primary and included in a relation.

26. A method according to claim 25, wherein the method further comprises the step of supplying a table visible image based on relations to a terminal.

27. A method according to claim 25, wherein the method further comprises the steps of calculating a tuple count for each said relation of said relational database at a predetermined time and, if the calculation result is greater than a predetermined value, performing said step c) and/or said step d) on a relation having said tuple count.

28. A method according to claim 25, further comprising a step for detecting a predetermined character of attributes of said relation of said relational database,...

a step for informing a terminal of said detection results, a step for inputting an instruction from said terminal, a, step for converting, when a relation to be restructured of said relational database has a non-normal form, said non-normal form into a first normal form in accordance with the instruction.

29. A method according to claim 25, wherein step b) further comprises the step of informing an operator of a result determined in step a), inputting an enable/disable division instruction from the operator, and controlling division processing in accordance with the instruction.

30. A system according to claim 25, wherein the method further comprises the step of converting each of at least one third normal form relations divided by the step b) in the step d) into a relation having a normal form at a level higher than that of said third normal form.

31. A system according to claim 25, wherein the method further comprises the step of detecting an abnormality occurring when tuples are updated and performing the step c) in accordance with the updating abnormality.

32. A system according to claim 25, wherein the method further comprises the step of detecting a null value in values of said tuples and eliminating an attribute corresponding to said null value from a relation to be restructured.

* * * * *